US010333720B2

(12) United States Patent
Kravitz et al.

(10) Patent No.: US 10,333,720 B2
(45) Date of Patent: *Jun. 25, 2019

(54) SECURE COMMUNICATION OF IOT DEVICES FOR VEHICLES

(71) Applicant: T-CENTRAL, INC., Dover, DE (US)

(72) Inventors: David W. Kravitz, San Jose, CA (US); Donald Houston Graham, III, Pasadena, CA (US); Josselyn L. Boudett, Clearwater, FL (US); Russell S. Dietz, San Ramon, CA (US); Kent William Stacy, Reno, NV (US)

(73) Assignee: T-CENTRAL, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,140

(22) Filed: Feb. 6, 2018

(65) Prior Publication Data

US 2018/0183610 A1 Jun. 28, 2018

Related U.S. Application Data

(60) Division of application No. 15/686,076, filed on Aug. 24, 2017, which is a continuation-in-part of (Continued)

(51) Int. Cl.
*H04L 9/32* (2006.01)
*H04L 29/06* (2006.01)
(Continued)

(52) U.S. Cl.
CPC .......... *H04L 9/3268* (2013.01); *H04L 9/0819* (2013.01); *H04L 9/3255* (2013.01);
(Continued)

(58) Field of Classification Search
CPC .................. H04L 9/3268; H04L 9/0819; H04L 63/0876; H04L 63/10; H04L 9/32;
(Continued)

(56) References Cited

U.S. PATENT DOCUMENTS 7,085,365 B2 * 8/2006 Kauppinen ............. H04W 4/08
379/202.01
7,263,611 B2 * 8/2007 Itkis ...................... H04L 9/0833
380/278

(Continued)

FOREIGN PATENT DOCUMENTS

CN 105791272 A 7/2016

OTHER PUBLICATIONS

International Search Report ,Transmittal, and Recordation of Search History (12 pages) and Written Opinion (6 pages) for related International Patent Application No. PCT/US17/24112 filed Mar. 24, 2017.

*Primary Examiner* — Thanhnga B Truong
(74) *Attorney, Agent, or Firm* — Lewis Roca Rothgerber Christie LLP

(57) ABSTRACT

Method for establishing secure communication between a plurality of IoT devices in one or more vehicles include: provisioning the plurality of IoT devices by providing a unique identification, a digital identity token and a cryptographic key to each of the plurality of IoT devices; establishing a secure communication line between the plurality of IoT devices by authenticating respective communication lines between respective IoT devices and issuing a digital certificate to the respective communication lines; grouping the plurality of IoT devices into different groups based on a predetermined criteria; and including a group membership for a group of the different groups in an attribute certificate indicating group characterization.

5 Claims, 12 Drawing Sheets

Related U.S. Application Data application No. 15/621,982, filed on Jun. 13, 2017, now Pat. No. 9,832,026, which is a continuation of application No. 15/469,244, filed on Mar. 24, 2017, now Pat. No. 9,716,595, which is a continuation-in-part of application No. 15/269,832, filed on Sep. 19, 2016, now abandoned, which is a continuation of application No. 15/002,225, filed on Jan. 20, 2016, now Pat. No. 9,455,978, which is a continuation of application No. 14/218,897, filed on Mar. 18, 2014, now Pat. No. 9,270,663, and a continuation-in-part of application No. 13/481,553, filed on May 25, 2012, now abandoned, and a continuation-in-part of application No. 13/096,764, filed on Apr. 28, 2011, now abandoned, said application No. 15/469,244 is a continuation-in-part of application No. 15/409,427, filed on Jan. 18, 2017, now abandoned, which is a continuation of application No. 15/154,861, filed on May 13, 2016, now Pat. No. 9,578,035, which is a continuation of application No. 14/715,588, filed on May 18, 2015, now Pat. No. 9,356,916, which is a continuation-in-part of application No. 14/218,897, filed on Mar. 18, 2014, now Pat. No. 9,270,663, said application No. 15/154,861 is a continuation-in-part of application No. 13/481,553, filed on May 25, 2012, now abandoned, and a continuation-in-part of application No. 13/096,764, filed on Apr. 28, 2011, now abandoned.

(60) Provisional application No. 62/536,884, filed on Jul. 25, 2017, provisional application No. 62/313,124, filed on Mar. 25, 2016, provisional application No. 62/326,812, filed on Apr. 24, 2016, provisional application No. 62/330,839, filed on May 2, 2016, provisional application No. 62/347,822, filed on Jun. 9, 2016, provisional application No. 62/369,722, filed on Aug. 1, 2016, provisional application No. 62/373,769, filed on Aug. 11, 2016, provisional application No. 62/401,150, filed on Sep. 28, 2016, provisional application No. 61/792,927, filed on Mar. 15, 2013, provisional application No. 61/650,866, filed on May 23, 2012, provisional application No. 61/490,952, filed on May 27, 2011, provisional application No. 61/416,629, filed on Nov. 23, 2010, provisional application No. 61/367,576, filed on Jul. 26, 2010, provisional application No. 61/367,574, filed on Jul. 26, 2010, provisional application No. 61/330,226, filed on Apr. 30, 2010, provisional application No. 62/133,371, filed on Mar. 15, 2015, provisional application No. 61/994,885, filed on May 17, 2014, provisional application No. 61/792,927, filed on Mar. 15, 2013, provisional application No. 61/650,866, filed on May 23, 2012, provisional application No. 61/490,952, filed on May 27, 2011, provisional application No. 61/416,629, filed on Nov. 23, 2010, provisional application No. 61/367,576, filed on Jul. 26, 2010, provisional application No. 61/367,574, filed on Jul. 26, 2010, provisional application No. 61/330,226, filed on Apr. 30, 2010.

(51) Int. Cl.
*H04L 9/08* (2006.01)
*H04W 12/06* (2009.01)
*H04W 12/08* (2009.01)

(52) U.S. Cl.
CPC ...... *H04L 63/0823* (2013.01); *H04L 63/0876* (2013.01); *H04L 63/10* (2013.01); *H04W 12/06* (2013.01); *H04W 12/08* (2013.01); *H04L 2209/84* (2013.01)

(58) Field of Classification Search
CPC ....... H04L 12/413; H04L 9/14; H04L 9/0833; H04L 9/3255; H04L 63/0823; H04M 3/42; H04M 1/274; H04M 1/2745; H04M 1/72; H04M 1/725; H04M 15/04; H04M 15/06; G06F 1/26; H04Q 7/38; H04W 12/06; H04W 12/08
USPC ............. 713/156, 163; 709/245; 379/202.01, 379/203.01, 245, 142.01; 700/287; 370/445, 337; 290/1 A; 307/9.1; 380/278
See application file for complete search history.

(56) References Cited

U.S. PATENT DOCUMENTS

| | | |
|---|---|---|
| 8,520,695 B1 | 8/2013 | Rubin et al. |
| 8,656,484 B2 | 2/2014 | Barton et al. |
| 9,094,407 B1 | 7/2015 | Matthieu et al. |
| 2003/0063735 A1* | 4/2003 | Brockenbrough .. H04L 63/0407 379/245 |
| 2007/0050618 A1 | 3/2007 | Roux et al. |
| 2010/0262308 A1 | 10/2010 | Anderson et al. |
| 2015/0334554 A1 | 11/2015 | Song et al. |
| 2016/0087933 A1* | 3/2016 | Johnson ................. H04W 4/70 709/245 |

* cited by examiner

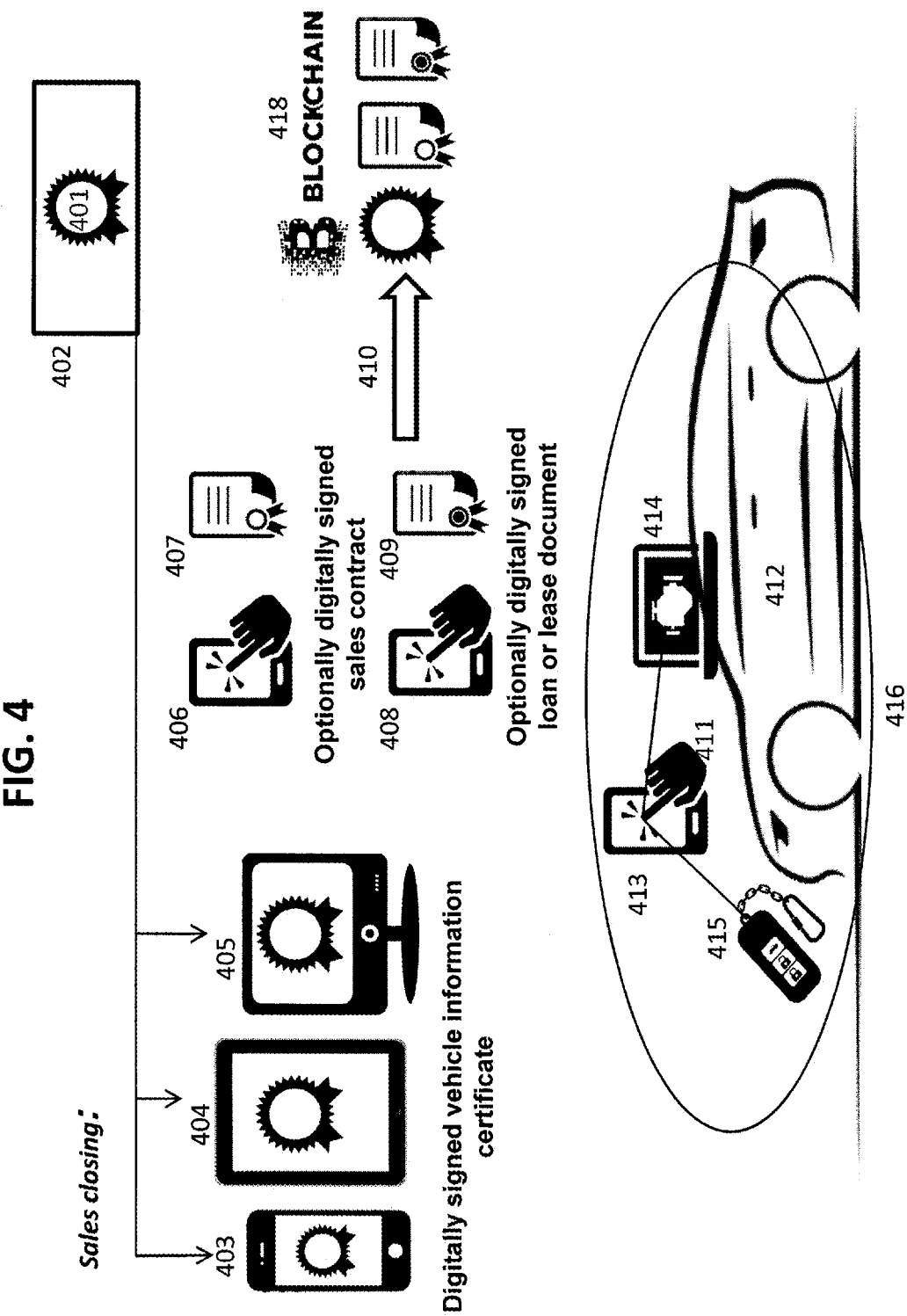

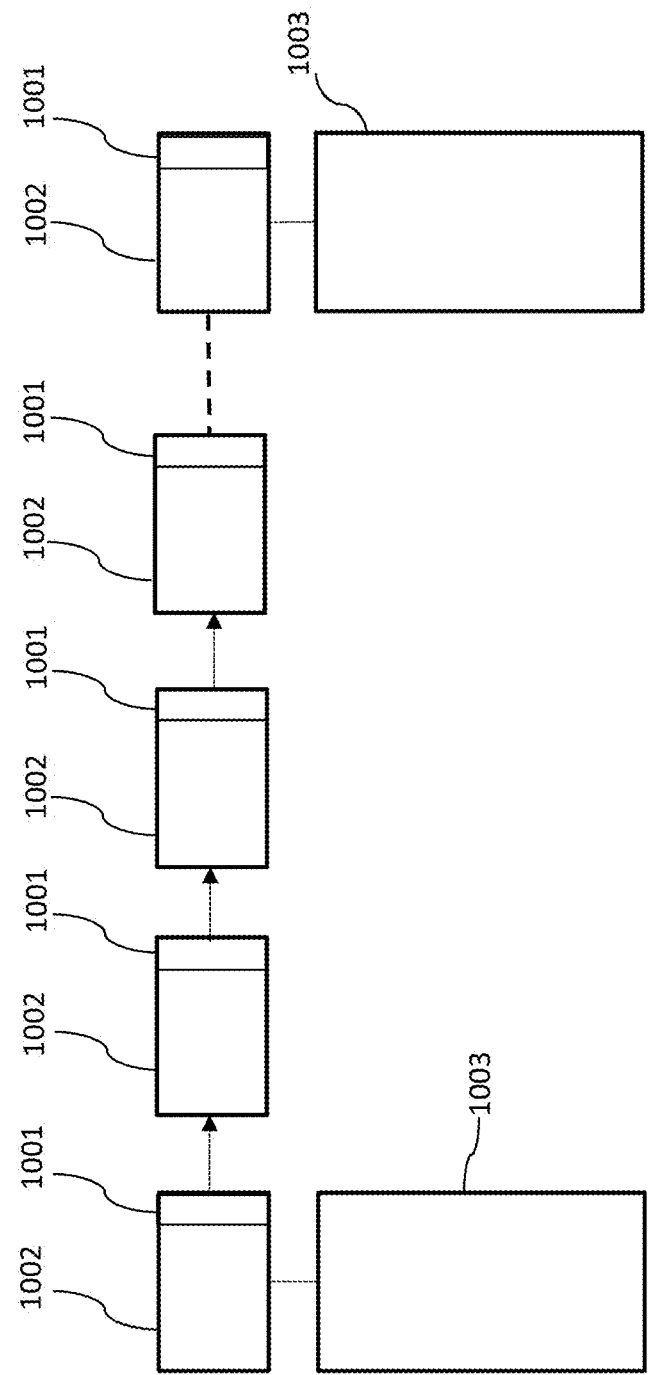

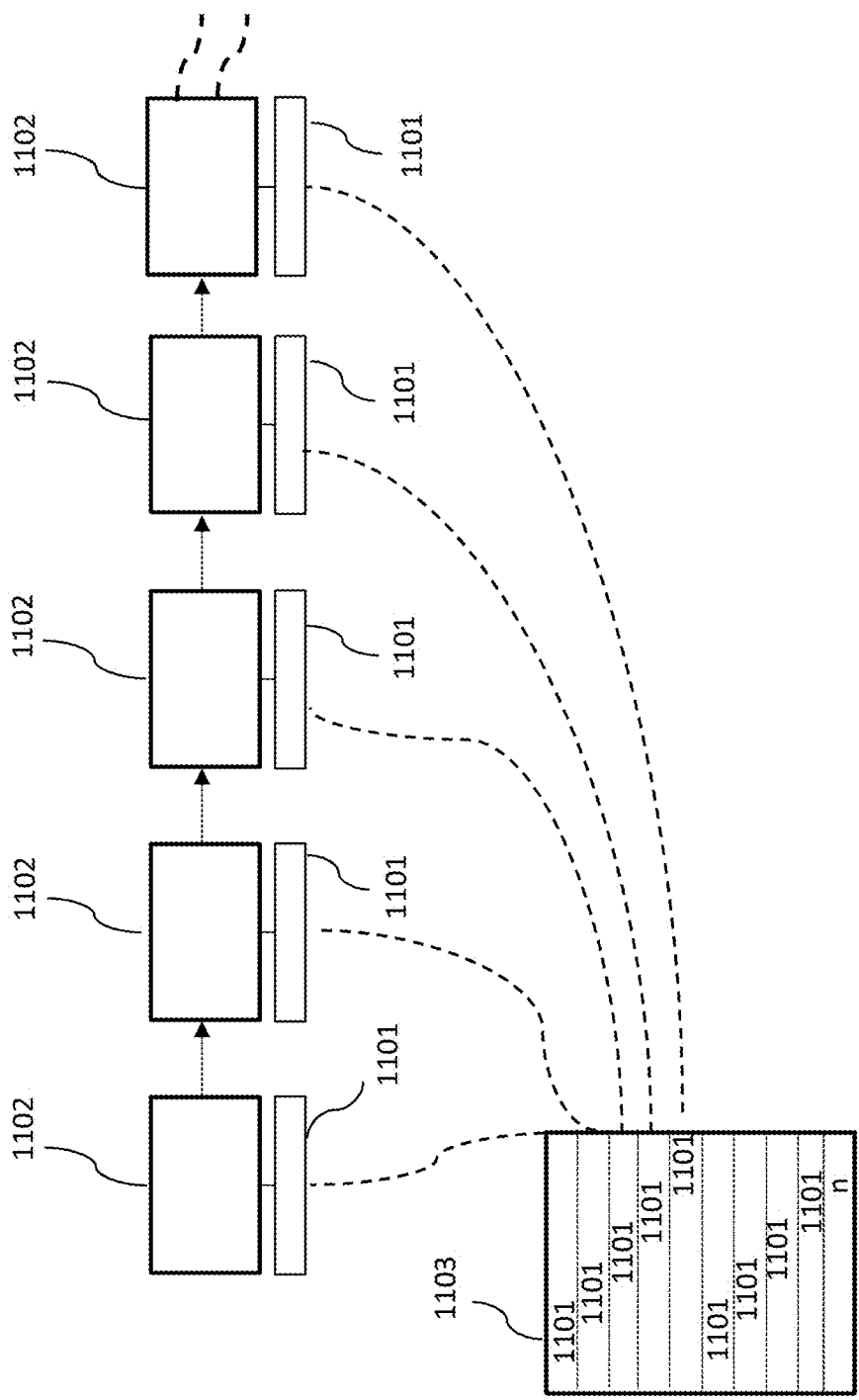

SECURE COMMUNICATION OF IOT DEVICES FOR VEHICLES

CROSS-REFERENCE TO RELATED APPLICATIONS

This application is divisional of U.S. patent application Ser. No. 15/686,076 filed on Aug. 24, 2017, which is a continuation-in-part of U.S. patent application Ser. No. 15/621,982 filed on Jun. 13, 2017 and claims the benefit and the priority to U.S. Provisional Patent Application No. 62/536,884 filed on Jul. 25, 2017.

Said U.S. patent application Ser. No. 15/621,982 is a continuation of U.S. patent application Ser. No. 15/469,244 filed Mar. 24, 2017 (now issued as U.S. Pat. No. 9,716,595), which claims the benefit of U.S. Provisional Patent Application Nos. 62/313,124 filed Mar. 25, 2016; 62/326,812 filed Apr. 24, 2016; 62/330,839 filed May 2, 2016; 62/347,822 filed Jun. 9, 2016; 62/369,722 filed Aug. 1, 2016; 62/373,769 filed Aug. 11, 2016; and 62/401,150 filed Sep. 28, 2016; and is a continuation-in-part of U.S. patent application Ser. No. 15/269,832 filed Sep. 19, 2016; and said U.S. patent application Ser. No. 15/269,832 is a continuation of U.S. patent application Ser. No. 15/002,225 filed Jan. 20, 2016 (now issued as U.S. Pat. No. 9,455,978) and said U.S. patent application Ser. No. 15/002,225 is a continuation of U.S. patent application Ser. No. 14/218,897 filed Mar. 18, 2014 (now issued as U.S. Pat. No. 9,270,663) and said U.S. patent application Ser. No. 14/218,897 claims the benefit of U.S. Provisional Patent Application No. 61/792,927 filed Mar. 15, 2013. U.S. patent application Ser. No. 15/002,225 is also a continuation-in-part of U.S. patent application Ser. No. 13/481,553 filed May 25, 2012, which claims the benefit of U.S. Provisional Patent Application Nos. 61/650,866 filed May 23, 2012 and 61/490,952 filed May 27, 2011.

Said U.S. patent application Ser. No. 15/002,225 is also a continuation-in-part of U.S. patent application Ser. No. 13/096,764 filed Apr. 28, 2011, which claims the benefit of U.S. Provisional Patent Application Nos. 61/416,629 filed Nov. 23, 2010; 61/367,576 filed Jul. 26, 2010; 61/367,574 filed Jul. 26, 2010; and 61/330,226 filed Apr. 30, 2010.

Said U.S. patent application Ser. No. 15/469,244 is a continuation-in-part of U.S. patent application Ser. No. 15/409,427 filed Jan. 18, 2017, which is a continuation of U.S. patent application Ser. No. 15/154,861 filed May 13, 2016 (now issued as U.S. Pat. No. 9,578,035), and said U.S. patent application Ser. No. 15/154,861 is a continuation of U.S. patent application Ser. No. 14/715,588 filed May 18, 2015 (now issued as U.S. Pat. No. 9,356,916), which claims the benefit of U.S. Provisional Patent Application Nos. 62/133,371 filed Mar. 15, 2015; 61/994,885 filed May 17, 2014; and 61/367,576 filed Jul. 26, 2010. Said U.S. patent application Ser. No. 14/715,588 is also a continuation-in-part of Ser. No. 14/218,897 filed Mar. 18, 2014 (now issued as U.S. Pat. No. 9,270,663), which claims the benefit of 61/792,927 filed Mar. 15, 2013. Said U.S. patent application Ser. No. 15/154,861 filed May 13, 2016 is a continuation-in-part of U.S. patent application Ser. No. 13/481,553 filed May 25, 2012, which claims the benefit of U.S. Provisional Patent Application Nos. 61/650,866 filed May 23, 2012 and 61/490,952 filed May 27, 2011.

Said U.S. patent application Ser. No. 15/154,861 filed May 13, 2016 is a continuation-in-part of U.S. patent application Ser. No. 13/096,764 filed Apr. 28, 2011, which claims the benefit of U.S. Provisional Patent Application Nos. 61/416,629 filed Nov. 23, 2010; 61/367,574 filed Jul. 26, 2010; and 61/330,226 filed Apr. 30, 2010.

The entire contents of all of the above-identified applications are hereby expressly incorporated herein by reference.

FIELD OF THE INVENTION

The present invention relates generally to Internet of Things (IoT) Security and Management and more specifically to system and method for vehicle IoT security and management.

BACKGROUND

Many businesses, organizations, governments and others that are responsible for the security, operations, support and maintenance of Internet of Things (IoT) devices are increasingly confronting challenges. IoT devices are increasingly performing important roles in many areas of a modern economy, including facilities for manufacturing, utilities, distribution, recreation, military, residential, commercial, healthcare and others. In addition, IoT devices are incorporated into manufactured products that may or may not be associated with the above facilities such as, automobiles, aircraft, medical devices, etc. For such product manufactures, protecting, controlling and managing the IoT devices (which are typically manufactured by third-parties) can be challenging, fraught with danger, risk or potential liability.

It is desirable for both manufactured products (together with their incorporated IoT devices) as well as for enterprises deploying IoT devices in their operating facilities (e.g., a factory, utility grid, etc.) to ensure control over the data that is produced, exert access control so that unauthorized, random parties cannot get access to the device, have the ability to instruct a device(s) to listen only to authorized parties, have the ability for a device(s) to ignore unauthorized parties, and/or to provide strong identity management for typical IoT device(s) and devices that may be within such operating IoT devices to external, authorized systems or entities.

It is also desirable for typical devices to be configurable and easily updatable only with authorized, verified firmware. IoT devices may also contain or have access to sensitive personal or business information that entities owning, controlling or otherwise having a direct interest in those devices may wish to control external access to or to otherwise protect.

SUMMARY

In some embodiments, the disclosed invention is a method for establishing secure communication between a plurality of IoT devices in one or more vehicles, each IoT device including a hardware processor and associated memory. The method includes: provisioning the plurality of IoT devices by providing a unique identification, a digital identity token and a cryptographic key to each of the plurality of IoT devices; establishing a secure communication line between the plurality of IoT devices by authenticating respective communication lines between respective IoT devices and issuing a digital certificate to the respective communication lines; grouping the plurality of IoT devices into different groups based on predetermined criteria; and including a group membership for a group of the different groups in an attribute certificate indicating group characterization.

In some embodiments, the disclosed invention is a method for establishing secure communication between a plurality of IoT devices in one or more vehicles, each IoT device including a hardware processor, associated memory, a unique identification, a digital identity token and a cryptographic key. The method includes: inviting a second IoT device by a first IoT device to establish a communication line with the first IoT device by receiving a digital identity token from the second IoT device; establishing a secure communication line between the first IoT device and the second IoT device by authenticating a communication line between the first IoT device and the second IoT device and issuing a digital certificate to the communication line; grouping the plurality of IoT devices into different groups based on a predetermined criteria; and including group memberships for the different groups in respective attribute certificates of the respective devices.

In some embodiments, each of the secure communication lines may include a digital agreement establishing terms of use of said each secure communication line between respective IoT devices. In some embodiments, a group may be issued an attribute certificate which includes associated rules for group membership in the attribute certificate. In some embodiments, the different groups include sub-groups and each different vehicle may have a different group and each sub-group of a respective group includes components of that vehicle.

BRIEF DESCRIPTION OF THE DRAWINGS

These and other features, aspects, and advantages of the present invention will become better understood with regard to the following description, appended claims, and accompanying drawings.

FIG. 4 shows a security system for authenticating a new product including IoT devices, according to some embodiments of the disclosed invention.

FIG. 10 shows an exemplary method of using digital signatures in bandwidth-restricted environments, according to some embodiments of the present invention.

FIG. 11 shows an exemplary method of transmitting a digital signature while minimizing the bandwidth required for such transmission, according to some embodiments of the present invention.

DETAILED DESCRIPTION

Figure 1:
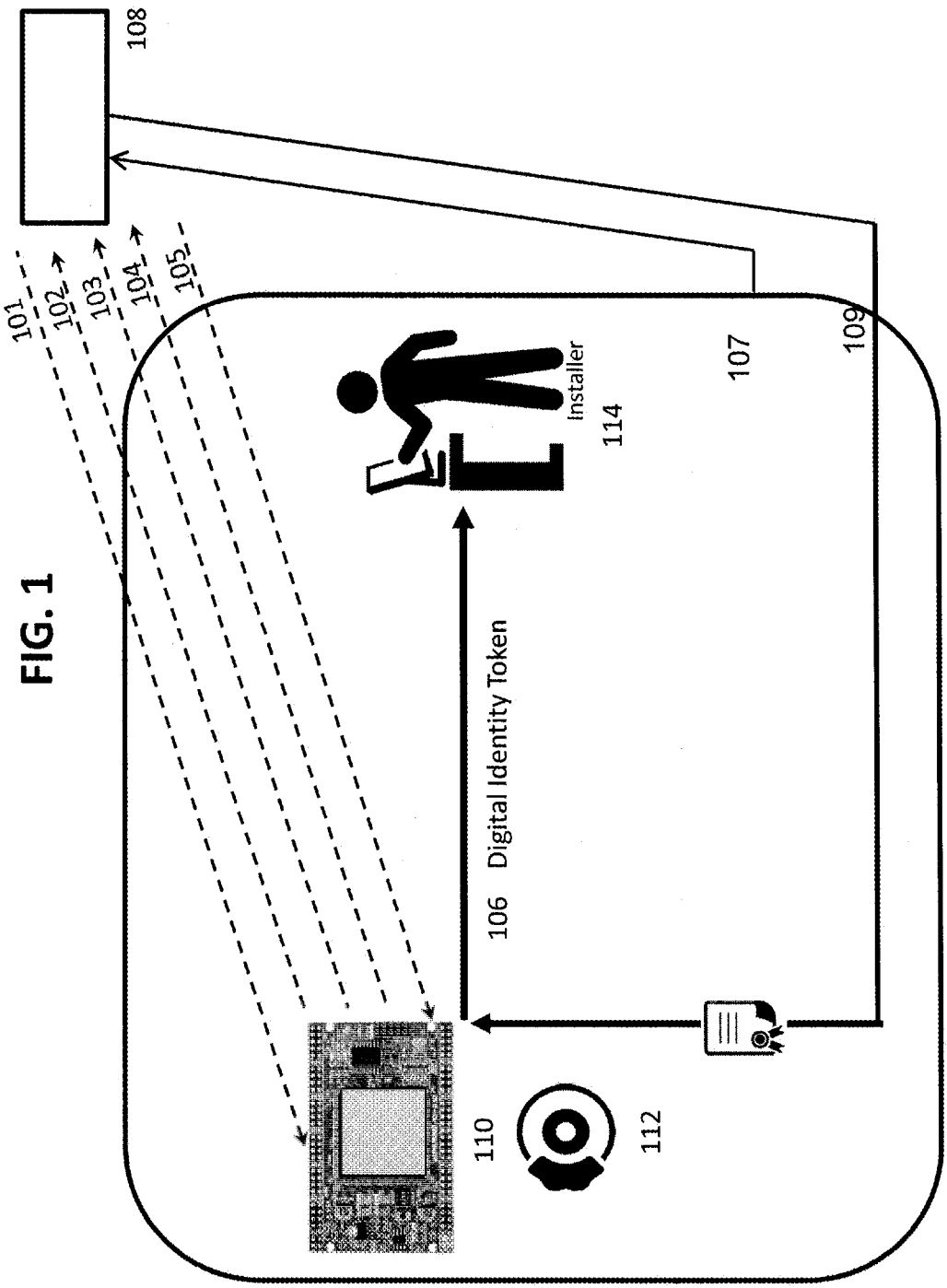
FIG. 1 shows a security system for performing an exemplary provisioning process for a IoT device, according to some embodiments of the disclosed invention.

In some embodiments, the disclosed invention is a method for establishing a secure communication between a plurality of IoT devices related to one or more vehicles, such as automobiles, boats, motorcycles and aircrafts.

In some embodiments, the security ecosystem of the disclosed invention provides many of the above mentioned capabilities through the use of a central server configured with one or more of an attribute authority (AA) acting as a trusted third party mediating service provider by using one or more of a public key infrastructure (PKI), including one or more of a certification authority, registration authority, hardware security module (HSM), validation authority (VA, possibly by online certificate status protocol, OCSP, or certificate revocation list, CRL), a privilege management infrastructure (PMI), virtual network protocol (VPN) technology, device-side client applications, cloud hosting, authentication and light active directory access protocol (LADP). In some embodiments, the security ecosystem of the disclosed invention may also provide specifications to third-party IoT device manufacturers (whose IoT products may later be managed by the security ecosystem) combined possibly with other solutions. Current typical industry practice is to issue only a certificate to each endpoint from a central certification authority (CA). However, the security ecosystem of the disclosed invention not only issues certificates to endpoints, but it also issues certificates to each authenticated communication line 705 that pairs of endpoints may establish (have established) and use.

In some embodiments, this security ecosystem may result in real time management of credentials, identity profiles, communication lines, and/or keys. It is capable of distributing tunable rights to authorized users/devices. Using a security ecosystem's user-managed, device-managed, operator-managed, or artificial intelligence-managed inviter-invitee protocol suite, inviters may vouch for the identity of the invitees who may successfully complete the protocol establishing secure communication lines, for example, with identity support information supplied by the security ecosystem. Users/devices may establish and respond to authorization requests and other real-time verifications pertaining to accessing a typical communication line (not an endpoint), which may share encrypted communications.

Typically, a communication line may be accompanied by a digital agreement establishing terms (e.g., rules and/or business logic) of the use of the communication line between the endpoints. These agreement are generally auditable, brokered, trusted-relationships where such relationships/digital agreements may each stand-alone (generally for privacy) or may leverage the build-up of identity confidence levels across relationships. These relationships may be organized into defined "groups". In some embodiments, a cryptographically-secured group may include all or one or more subset group of the devices incorporated within a single manufactured product, for example, in different embodiments, a group may encompass endpoint IoT devices within an automobile, aircraft, medical device, household appliance and the like.

According to some embodiments of the disclosed invention, individually manufactured IoT devices as well as manufactured products (which incorporate IoT devices)

include one of more of the following capabilities. They ensure control over data that is produced, which may include protection of data (e.g., using encryption) and possibly movement of the data; exert access control so that unauthorized, random parties cannot get access to the devices; have the ability to instruct the device to listen only to authorized parties so that man-in-the-middle attacks can be prevented or mitigated. These devices may also provide strong identity management, not only for multiple IoT devices that may be within the product, but also from the product to external, authorized systems or devices.

Many devices may be configurable and easily updatable only with authorized, signed firmware code that is signed using a private key that corresponds to a subject public key within typically a code signing certificate issued by a certification authority recognized by a host computer or device. One example of a manufactured product that may benefit from the solution described herein is an automobile. There have been a number of reports of automobiles having been remotely hacked. Once having access to the system, the hacker was able to use the automobile's controller area network (CAN) bus to access and take at least partial control over multiple electronic control units (ECUs): such as engine, brake, speed, steering, and/or others. The disclosed invention may be applicable to a variety of ECUs such as human machine interface, engine control unit, transmission control unit, steering control unit, telematics control unit, speed control unit, battery management system, seat and door control units, and the like.

In some embodiments, the disclosed invention leverages the unique properties of a secure component or a physically unclonable function (PUF), and provides one or more of: a foundation for reliably establishing the identity of an IoT device, solves gaps of traditional firewall security, authenticates remote identities, exchanges authenticated public keys, prevents random device access, protects and controls data, and/or updates devices with signed firmware.

In some embodiments, the devices incorporating the disclosed invention are capable to control and use protected cryptographic keys. In some embodiments, multiple IoT devices may be used together in a coordinated manner or in an assembled product in order deliver a complex or integrated solution that may otherwise require specialized skill sets, by integrating IoT devices (which incorporate cryptographic and security capabilities according to the disclosed invention) into an assembled product.

For the purposes of the system of the disclosed invention, IoT devices are endpoints and are generally composed of two broad types as follows.

"Control IoT" or "CIoT" devices are the type of client IoT devices that may also be used to control or manage one or more similar IoT devices or IoT devices of a more limited nature. For example, CIoT devices may include an ECU in an automobile.

A "Limited IoT" or "LIoT" device typically does not include the processing or memory capacity or other capabilities of a typical CIoT devices (with greater memory, processing power, etc.). LIoT devices may include sensors, switches, actuators, controllers, and the like.

Considering the limited processing and other capabilities of a LIoT device, all or portions of the ecosystem system's complete inviter-invitee provisioning protocol may be installed into the device in a partially pre-completed state during its manufacturing process. Also, pre-assigned on such a LIoT device may be a unique protocol address or identifier assigned to the device and keys for one or more trusted CIoT devices or other trusted devices within the security ecosystem. For example, public keys may be provided to designate to LIoT devices when those public keys are associated with devices or endpoints that the LIoT device is to trust. These would be devices that might offer trusted services to the LIoT device, such as a firmware-signing authority, administer/user-controlled device, trusted management device (e.g. a CIoT), Trusted Group devices or others. Throughout this disclosure, the terms "IoT device" or "IoT endpoint" may be used to refer to either a CIoT or LIoT device. The terms "device" or "endpoint" may refer to an "IoT device", "IoT endpoint", user/endpoint, CIoT, LIoT device, "container" or user-controlled device such a mobile device, computing device, etc.

Typically, assignments of limited lot (LIoT) devices may be reported to, managed or controlled by a control IoT (CIoT) device. Based on the information described above being collected and certified by a CIoT device, an AA may create a digital certificate for each LIoT device with the collected, verified information. For example, such a digital certificate may include a device's unique identifying information, its device type and capabilities. It may also include the LIoT device's relationship to a CIoT device(s), address, installed location, inviter-invitee provisioning process relationships, group membership, manufacture's certification and other information as appropriate. Such certificates may be automatically and continuously updated and maintained throughout the life cycle of the product.

The security ecosystem of the disclosed invention allows for multiple methods of provisioning the device to achieve an endpoint unique identity for the device. In some embodiments, an IoT device manufacturer's specification may be created by which manufactures of IoT devices or products incorporate IoT devices (such as: televisions; refrigerators; security systems; thermostats; and the like) to incorporate the technology into their devices at the time of manufacture. In some embodiments, this technology may be in the form of fully custom digital logic, IP logic blocks incorporated into the device's existing digital logic, programmable logic implemented using FPGA technology built into the device, fully custom firmware included with the device's own custom firmware, or an open-source or proprietary firmware stack added to the device's firmware. For devices with updateable programmable logic resources and/or firmware, this technology may also be embodied in the device after the time of manufacture. Some embodiments of conformance with the specification would be for the firmware of the IoT device to support a device's adherence to any rules included in the digital agreement that is typically recorded in a digital certificate attesting to a communication line between that endpoint device and another endpoint and establishing terms (e.g., rules and/or business logic) of the use of the communication line established between the endpoints. Such specification may also require that IoT devices only communicate to previously authenticated endpoints and no others. An IoT device endpoint may have communication lines typically established between it and one or more other endpoints, typically a device with which it needs to communicate in order to meet operational or other needs.

The rules, procedures, policies described herein may be incorporated in a written specification to be provided to a manufacturer of an IoT device, as well as possibly the various supply chain suppliers to that manufacturer (e.g., chip, field programmable gate arrays (FPGA) or others) in order for them to design, produce, manufacture, assemble or otherwise contribute to the creation of IoT devices that integrate with the security ecosystem. Included in such a specification may be methods for the security ecosystem to manage secure firmware updates of all managed IoT devices.

Specification-conforming device firmware of such an IoT device endpoint would reject or ignore communication from any unknown endpoint that has not previously been authenticated through the establishment of a secure communication line, and would talk only to previously authenticated endpoints with established communication lines and supported by digital certificates. Device firmware may initially conform with the specification or may be brought into conformance with the specification by way of a firmware update at a later time. An IoT device can be made in conformance with the specification or as a more basic device onto which the device's owner (e.g., owner, manufacturer, or others who desire to increase the security and manageability of the IoT devices that they may own or control) may install an appropriate application that would cause such device to perform as an IoT device in general conformance with the specification and described functionality of the security ecosystem.

By applying principles and procedures similar to those described for a manufacturer of products (that incorporate IoT devices) and making use of the capabilities of the security ecosystem, an owner may enhance the security of such acquired or controlled IoT devices, as well as enhance the owner's management and control over such owned or controlled IoT devices, as well as possibly obtain other of the capabilities, features and/or benefits described in this application. Moreover, all or portions of the provisioning steps may be done by an IoT device manufacturer, and/or all or portions may be done by (or on behalf of) a device customer.

In some embodiments, an IoT device manufacturer may be provided with comprehensive installation support procedures as well as configuration options to utilize and to optimize both their manufacturing process and operational performance. Within the security ecosystem environment, an IoT device can be assigned a unique address, for example an internet protocol (IP) address or other identifier, as a step in its manufacturing process or, if desired, when the device is put into service. The address can be securely stored on the IoT device in a re-writable memory facility or in a permanent fashion in a secure component. The security ecosystem device manufacturing specification may require the device address to be visible on the device itself via alpha/numeric or QR code, or both.

The specification allows a device to optionally be programmed such that when the device powers up, it broadcasts a confirmation message, such as a "Hello" message with its address, together with other identifying information such as its model number, serial number, public keys, current white list, current firmware version, etc. One example of the use of this feature is during the period when components are being installed in automobiles at a manufacturing facility. At any time during testing, assembly, installation, quality inspections, etc., a technician may power and test devices, thereby capturing a device's unique "hello" message that comprehensively identifies that device. This feature may be useful to catalogue and assign a specific device designation associated with an installation location in an automobile (These messages may later be disabled).

In some embodiments, an unalterable manufacturer certification prior to IoT device delivery may be included in the specification for IoT device manufacturers. Such non-refutable certification can be in one of multiple acceptable forms such as a PKI certificate or other digital token stored in a secure component, or a physical data record on the device that is locally or remotely readable. At the time of manufacture of IoT devices intended for incorporation into the security ecosystem of the disclosed invention, the manufacturer may be asked to certify one or more of the following: (a) all communication leaving or being received by the device may be controlled by a specified application running on the IoT device (e.g., that the device firmware recognizes and supports the secure communication lines technology of the security ecosystem), (b) all or designated communications leaving or being received by the device may only be sent to IP addresses on an updatable white list and/or addresses associated with entities authenticated through an inviter-invitee protocol and/or otherwise provided to the device by an authorized endpoint, (c) additional conditions as may be deemed appropriate, and (d) that no manufacturer certification is made.

In some embodiments, in the case of some IoT devices, a unique identifier or cryptographic key may be pre-installed during the manufacturing process of the device, or in some cases, injected after the manufacturing of the device. In some embodiments, a trusted platform module (TPM) or physically unclonable function (PUF) may be used to provide a unique identity or cryptographic key on the device. With PUF technology, security keys and unique identifiers can be extracted from the innate characteristics of a semiconductor within a device. These unique keys are typically only generated when required and typically do not remain stored on the system, hence providing a high level of protection. The unique key generated with PUF technology allows for the bootstrapping of a cryptographic system (such as what is needed within the IoT/endpoint client of the security ecosystem) to establish a root key. In some embodiments, the cryptographic algorithms and/or keys are protected or separated from the application software/firmware in some security subsystem inside the device.

In some embodiments, the security ecosystem IoT device client application may be installed onto a Field Programmable Gate Array (FPGA) or in other types of integrated circuits (ICs). For example, an FPGA, a controller, or a microprocessor may be provisioned with an IoT device client which may include one or more of a local key store module (LKSM), a security ecosystem assigned globally unique identifier (GUID) assigned to the device, public keys that are associated with devices, and endpoints that the IoT device is to trust (e.g., a firmware-signing authority, IoT management device; IoT support group; etc.). The LKSM typically includes the encryption management system (e.g., it may provide symmetric, asymmetric, elliptic curve, and/or cryptographic functionality) in the device that manages, for example: (a) a key pair for signature generation and signature verification, (b) key pair(s) for encryption and decryption, (c) a symmetric key for verifying integrity of data, and (d) cryptographic wrapping/unwrapping of digital asset-specific keys (that were initially generated potentially by a device client or cryptography microprocessor or potentially by a security ecosystem server or other), some of which may be installed in a secure component.

FIG. 1 shows an exemplary provisioning process for an IoT device, according to some embodiments of the disclosed invention. Typically, an installer with a computing device 114 would oversee this process or by an IoT device with internal intelligence or a computing device controlled by a program, such as an artificial intelligence program, may control the process. If the security ecosystem's client app has not been previously installed on the IoT device, it is downloaded (101) from the installer's computing device (114) or from a security ecosystem platform 108. The security ecosystem platform 108 includes one or more of a PKI, PMI and AA and more. A unique GUID may be associated with the client instance during client installation that is being registered with the security ecosystem in 102 (e.g., transferred via the installer's computing device 114). If not previously generated, a unique PUF-generated ID may be created on the device, in 103. The crypto capability on a processor within the device may create one or more public/private key pairs with at least one public key being transferred to the security ecosystem 108 directly or via the installer's computing device 114; also transferred may be device identifying information such as its model number, serial number, type name, current white list, current firmware version, etc. in 104.

A certificate is provided by the AA to the device attesting to the device's identity with one or more of the following: device client GUID, device ID, device public key, device public identity (e.g., type name, serial number, etc.), in 105. The device may create and sign a digital identity token (DIT as further described in the following section) asserting the device's identity, including one or more of: the device's specifications; identity; role or function; its public key; and possibly other information, in 106. This DIT can be presented to the installer computing device or possibly to the security ecosystem (or in other embodiments to an IoT device with internal intelligence or to a computing device controlled by an artificial intelligence computer program), which reviews and confirms the device's assertions and, in turn possibly certifies its confirmation to the device's assertions thereafter digitally signing the device's digitally signed assertions and sending that to the security ecosystem, in 107. Optionally, the security ecosystem may review these assertions and may create an attribute certificate or DIT affirming them, in 108. The security ecosystem may provide public key certificates of other devices and/or groups that the IoT device is to trust (e.g., firmware signing authority; automotive maintenance group as described in more detail later in this application) and to digitally sign them, certifying that they are to be trusted, and then provide the public key certificates to the IoT device, in 109 (possibly transferred via the installer's computing device 114). In some embodiments, a CIoT device (as described herein) may be substituted for an installer's computing device in one or more of the above steps.

In some embodiments, IoT devices are provided with a DIT. Typically, DIT tokens may be created from within an existing IoT device client thereby taking advantage of the digital signing capability of that IoT device client. The token typically includes the digital signature of that issuing device. In step 107, the token may be created with a configurable variety of identifying fields. In the case of an IoT device, these may include: device manufacturer, serial number, device type, device model, GUID, date of issuance, etc.

In some embodiments, secure boot and software attestation functions are provided to detect tampering with boot loaders and/or critical operating system files by checking their digital signatures and product keys. Invalid files are blocked from running before they might attack or infect the system or device, giving an IoT device a trust foundation when operating. Additionally, a trusted execution technology using cryptographic (or other) techniques to create a unique identifier for a subject component, enabling an accurate comparison of the elements of a startup (or operating) environment against a known good source and arresting the launch of code that does not match (or sending an alert to an appropriate device or endpoint or the security ecosystem). In some embodiments, detection may be a digital fingerprint of the device firmware installation, such as a PUF. Such a fingerprint (or cryptographic hash or other derivative thereof) may be incorporated into a DIT or digitally signed and used as a separate verification. One or more of these components may be integrated in one or more separate processors. (See for example, FIG. 1, steps 105 and 109).

In some embodiments, the provisioning process would also include the addition to the LKSM or secure component or other acceptable storage of public keys associated with trusted users, devices, entities, etc. For example, one of the most important added public keys to be trusted would be from the security ecosystem and the signer of the Public Key Certificates of all future trusted public keys to be used.

Trusted verification can be accomplished in a number of ways. In some embodiments for the assembly of an automobile, the security ecosystem issues a unique ID or pubic key certificate to be trusted, in the form of a digital certificate to the newly installed IoT device firmware client of the brake control unit to which only that IoT device client would have access (e.g., by using the public key of the IoT device client of the brake control unit). The IoT device client of the brake control unit may singularly decrypt that unique ID. The IoT device then creates a digital signed token composed of that unique ID possibly encrypted using its private key and return it to the security ecosystem.

The security ecosystem verifies that the IoT device client of the brake control unit provided an acceptable digital token confirming it uniquely has received the unique ID and/r public key certificate of devices to be trusted. The security ecosystem then creates a message confirming the correct key validation, digitally signs it using the private key associated with the public to be trusted, and returns it to the IoT device client of the Brake Control Unit. The veracity of the signed confirmation is verified using the public key to be trusted and the confirmation is complete. Thereafter, additional trusted keys may be added and other verified messages from the security ecosystem may verified through this or a similar digital signing capability. Examples of trusted entities whose trusted public keys may be added include: code signing authorities; a maintenance group; specified devices; etc.

In some embodiments, provisioned IoT devices may be added through the use of an inviter-invitee Protocol for IoT devices. The determination for specific relationships between designated IoT devices may be made by a number of authorized entities such as: users; the security ecosystem; a master IoT device management entity (e.g., a CIoT device); an IoT device with internal intelligence; an Artificial Intelligence (AI) system with access to the security ecosystem (e.g., the PKI/PMI and/or to the Attribute Authority) and directing the actions of the security ecosystem; etc. One or more of these may utilize the security ecosystem to instruct a designated IoT device to establish a secure communication line with one or more other designated IoT devices, including the establishment of rules and/or business logic (or possibly limited to the modification of existing rules and/or business logic). A proper instruction typically will include appropriate identification of both inviter and invitee devices, together with digitally signed authorization for such requests.

To facilitate authentication in the inviter-invitee process, the AA of the security ecosystem may provide to either or both of the inviter-invitee a question and/or the answer to that question to be used during the inviter-invitee protocol. Through such a security ecosystem directed or approved process, devices (possibly through the added use of an artificial intelligence capability or by an IoT device with internal intelligence) may be capable of executing such instructions with or without the need direct human intervention or action and establish secure communication lines between them with the support of a trusted third party AA. In some embodiments, the inviter-invitee process is controlled or managed by a human installer or by an automated process. Successful execution of the inviter-invitee protocol for IoT devices results in the establishment of the desired communication line and an attribute certificate with a digital agreement (as described herein) being created and recorded by the security ecosystem's AA, which is X.509 compliant in some embodiments.

Figure 2:
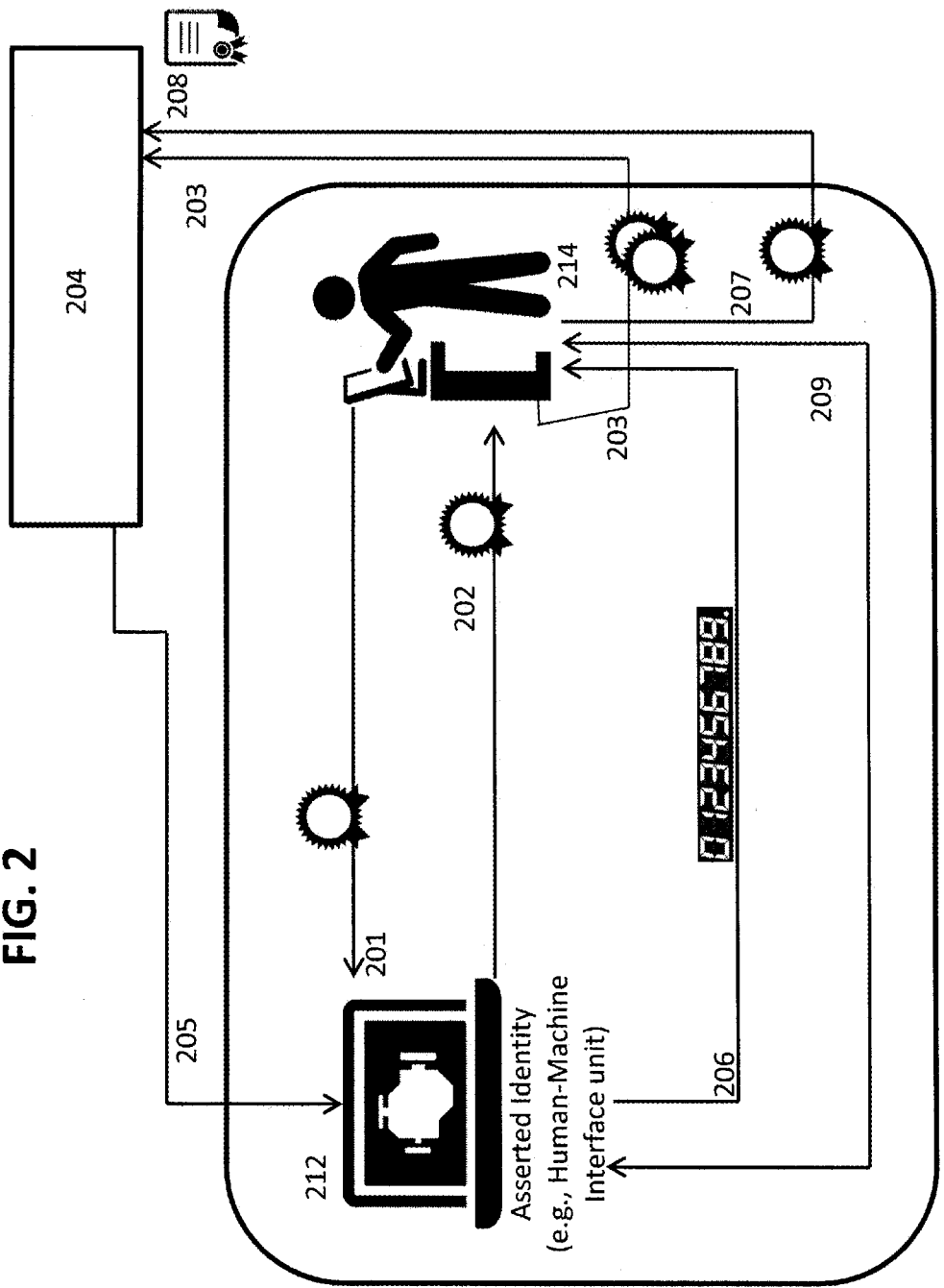
FIG. 2 depicts a security system for inviting an IoT device to mutually establish a secure communication line, according to some embodiments of the disclosed invention.

FIG. 2 depicts a security system for inviting an IoT device to mutually establish a secure communication line, according to some embodiments of the disclosed invention. This figure illustrates an automotive use case example of a security ecosystem user/endpoint (e.g., a system or device installer 214) wishing to invite a human machine interface unit 212 to join security ecosystem 204 and the systems installer wishes to be able to know, with certainty, that the IoT device client subsequently identified as belonging to the identified human machine interface unit was installed and is controlled for this specific human machine interface unit and has not been co-opted by a fraudster. The security ecosystem platform 204 includes one or more of a PKI, PMI and AA and others. Also the installer 214 may want to know that this human machine interface unit IoT device client is the only one on the security ecosystem network. Through a process of chain of custody of digital records to and from that IoT device, client may be certified by the security ecosystem.

When a new user/device (in this exemplary case the human machine interface unit 212) is invited (201) and goes through the IoT device client installation process, it may be asked whether it has a digital identity token. If so, the IoT device client loads the digital identity token shown by 202. The installer 214 may provide its certification to the DIT and transmit it to the security ecosystem, in 203. The security ecosystem network may then examine the token for authenticity, shown by 204. Each token is unique and may only be installed for a single security ecosystem user. In some embodiments, an additional out-of-band confirmation of successful installation is included for that IoT device client. An example of out-of-band confirmation may be included in the verification process whereby the security ecosystem 204 issues a unique ID (which may be encrypted using the public key of the human machine interface unit) to the newly installed IoT device client of the human machine interface unit to which only it would have access, shown by 205. IoT device client of the human machine interface unit 212 would then provide that unique ID (possibly digitally signed using its private key) to the confirming systems installer, in 206.

In some embodiments, the system's installer certifies to the security ecosystem 204 that he has personally confirmed with human machine interface unit 212 the completion of installation, and optionally includes such a unique ID with his certification to the security ecosystem, for example, through use of his own client application, in 207. Such a confirmation (particularly with the use of a one-time-only unique ID issued by the security ecosystem) would confirm the completion of a secure installation link and thereafter is able to support the future chain of custody of digital records sent between that IoT device client and other verified security ecosystem IoT device clients, as shown by 209. In some embodiments, the described inviter-invitee process generates audit trails based, in part, on digital signatures. Moreover, other actions and activities of the security ecosystem 204 may generate audit trails based, in part, on digital signatures.

The successful completion of the invitee processing may be understood to imply acceptance of any digital agreement(s) proffered by the inviter. This may involve use of a signature generation private key by the invitee's host computer/client/device that corresponds to a subject public key within a certificate that is referenced by a newly generated attribute certificate owned by the invitee. In some embodiments, X.509 protocol Attribute Certificates (ACs) underlie inviter and invitee processing. As a result of the inviter-invitee processing, the security ecosystem 204 pairs, under mutual agreement, an enterprise-level managed identity with a unique communication line to each authenticated and authorized user/endpoints.

Secure communication lines and device group management may be applied to provide more than one layer of security and/or privacy for devices and/or data. Such features may be achieved by applying one or more of the following: (a) rules/business logic that may be associated with secure communication line; (b) rules/business logic that may be associated with groups; and/or (c) permitting of communication only between designated groups and/or subgroups and/or external endpoints (whether any endpoints are IoT devices or other computing devices). These capabilities, whether individually or collectively, may provide stratifications of security.

In some embodiments, groups may be controlled both directly (by authorized endpoints) as well as through the use of an API (by authorized users). Such control may include the creation of groups and subgroups, the ability to add and delete devices or other endpoints as members, the ability name a group, the ability to create and modify rules for group members to follow, and other actions or data. There may be gradients of authority on the part of authorized endpoints or API users to create or modify such group parameters. An Artificial Intelligence (AI) software may be made an authorized user.

Figure 3:
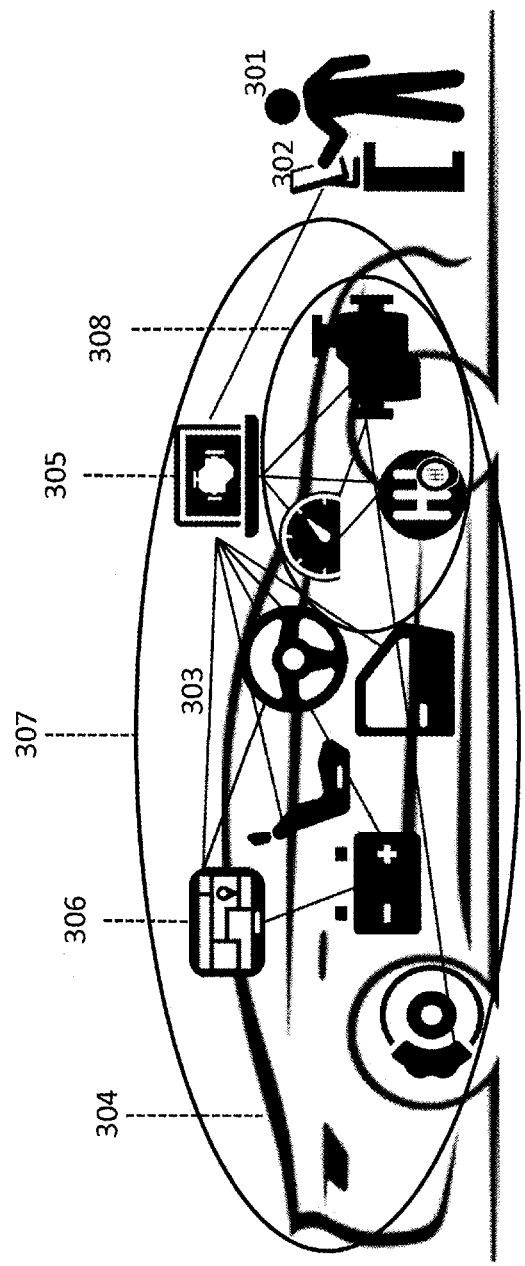
FIG. 3 illustrates a security system for establishing secure communication lines between multiple pairs of IoT devices in a vehicle, according to some embodiments of the disclosed invention.

FIG. 3 illustrates a security system for establishing secure communication lines between multiple pairs of IoT devices in a vehicle, according to some embodiments of the disclosed invention. Through the use of one or more methods of device provisioning and an inviter-invitee process, users/devices and/or the IoT devices within a manufactured or assembled product are able to establish unique presence, authenticate and link respective identities with devices, and establish authenticated, verified and secure communication lines between each other. This may be done by devices or devices supervised by an installer 301 operating an end user device 302, multiple human-operated end user devices, or end user device(s), via a human machine interface control unit 305.

These may optionally be used in the formation of relationships between devices 303 (e.g., a human-machine interface control unit 305 and a telematics control unit 306) that with the addition of other similarly paired devices may be organized into defined groups. For example, a cryptographically-secured group may include all of the devices together with their communication lines that may be incorporated within a single manufactured product, such as a vehicle 304, aircraft, medical device, etc. to establish secured, protected and auditable communication to and from that group 307. One or more subgroups of devices may be formed within a group 308 or possibly in a combination of devices with a group and devices outside of the group. Further, the record of the group members, their information, communication lines between the members, group membership and/or other pertinent information may be established, recorded and/or revoked in a security ecosystem. Device group membership as well as rules associated with membership in that group may be included on a certificate that is added (directly or indirectly by an AA) to one or more communication lines of devices within that group.

One example of a possible application of where this technology may improve security is the Controller Area Network (CAN) bus in vehicles. Device group management provides more than one layer of security by permitting communication only between designated groups and/or sub-groups, thus providing stratifications of security. Also, the use of rules associated with communication lines and/or groups may further direct the handling of information for data privacy, for example, by including a requirement(s) for encryption of data; or directing what devices/endpoints may or may not receive specified data. This technology may address the granularity of communication and data security requirements in such use cases.

Additional examples of the application of such technology include applications where data from manufactured products that incorporate IoT devices (e.g. vehicles, aircraft, medical devices and others) may be transferred to external endpoints. For example, in the automotive field, various such applications are expected to become wide-spread, such as: (A) Vehicle-to-vehicle (V2V) automobile technology that is designed to allow automobiles to communicate with each other; (b) Vehicle-to-infrastructure (V2I) which includes wireless exchange of critical safety and operational data between vehicles and roadway infrastructure; (c) Vehicle-to-Grid (V2G), a system in which, certain electric or hybrid vehicles communicate with the power grid to sell demand response services by returning electricity to the grid or by throttling their charging rate; (d) Vehicle-to-X (V2X) with refers to an intelligent transport system where all vehicles and infrastructure systems are interconnected with each other, thus providing more precise knowledge of the traffic situation across the entire road network; (e) On-board diagnostics (OBD) used in automobiles in which a vehicle's self-diagnostic and reporting capability may provide the vehicle owner or repair technician access to the status of the various vehicle subsystems; and (f) other external sources that may wish access to or information from such typed of manufactured products (which may include governmental access).

For instance, V2V communications is expected to form a wireless ad hoc network on the roads. V2V communications work by using the input of IoT devices, such as sensors, which monitor automobile operation and conditions, such as speed, brake action, traveled distance, and location. The collected data may be protected by encryption and may be automatically uploaded to a server using a wireless network after the occurrence of an event.

The system's group, secure communication line and rules/business logic is useful for controlling specific external access to devices and/or data. For example, the external sensors required for V2V activities may be grouped in an "External Sensor Group". For privacy concerns, the External Sensor Group may have controlled or limited identifying information (e.g., only generic make and model of the vehicle). Personal information regarding the driver or vehicle registration may remain private from the devices in that External Sensor Group through the use of (for example) rules associated with membership in that group. Devices of other vehicles (or possibly stationary or other types of computing devices) that are allowed to communicate with the V2V sensors would typically not have credentials to gain access to devices or information in the vehicle beyond those sensors in an External Sensor Group and as such, may be limited by rules/business logic. Such sensors may typically have carefully defined, limited and authenticated access to specific devices and information within the vehicle.

In some embodiments, an External Sensor Group may have variable configurations for its own identity that it may transmit externally. The configuration of the system provides for endpoints to be able to maintain multiple identities that may dynamically change based on certain mode and/or time of the operation of the vehicle or its sensors (IoT devices). That is, a vehicle or vehicle device groups may have multiple identities. One identity may be as minimal as the generic make and model of a car, for example an identity used by "External Sensor Group". A vehicle may additionally have one or more identities that are more detailed, such as: license plate; registration information; insurance information; etc. Such variable identity configurations may be modified automatically or manually. In some embodiments, a selection of vehicle identities may be provisioned to defined classes of vehicles, for example emergency vehicles. In some embodiments, a fire truck that is not operating in an emergency situation may broadcast an identity of a large vehicle or of a non-emergency fire truck. However, if the fire truck changes its operation into a mode of responding to an emergency call, then the identity of that fire truck may be broadcast as a responding emergency vehicle.

Vehicles receiving such different signals would typically respond differently. For example, little to no change of operation if the fire truck is broadcasting an identity of "a non-emergency fire truck", while if that same fire truck changes it identity to that of "responding emergency vehicle" the driver of another vehicle would typically pull to the side of the road (in the case of an autonomous vehicle, pulling to the side of the road may be automatic). The message broadcast by the fire truck may also include instructions such as: slow and pull to the side of the road, pull forward to the next intersection and leave this road entirely, pull forward so that I can make a left turn, or any message that might be desired.

Figure 3A:
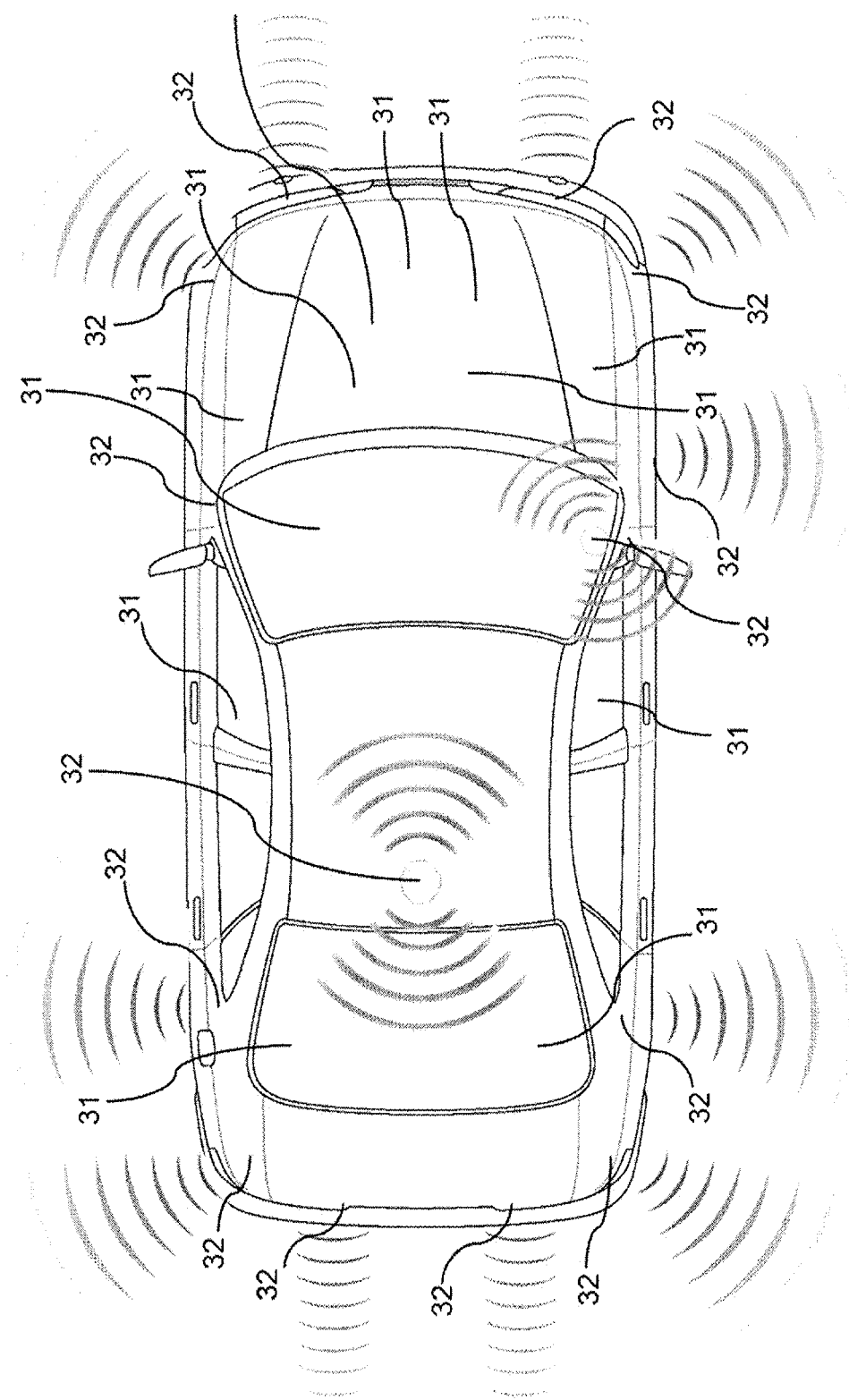
FIG. 3A shows exemplary types of IoT devices in a vehicle, according to some embodiments of the disclosed invention.

FIG. 3A shows exemplary types of IoT devices in a vehicle, according to some embodiments of the disclosed invention. As shown, reference numerals 31 signify IoT devices in (for example) an "Internal IoT Device Group." In some embodiments, these IoT devices do not typically connect externally. Examples may include Electronic Control Units (ECUs) and other devices that are used in the operation of the vehicle. Reference numerals 32 signify IoT devices in, for example, an "External Sensor Device Group," which may include sensors that monitor the vehicle's external area, and devices that communicate to other devices that are external to the vehicle, sharing information with them. In some embodiments, some or all of the reference numerals 31 and 32 devices may be combined in a "Vehicle Device Group" that comprises all the devices in the same vehicle.

Due to the fact that the system supports digital certificates, digital identity tokens, trusted public keys, group keys, etc., the broadcast message of the fire truck may be digitally signed in such a manner that a receiving node, for example, a vehicle or a non-vehicle node, such as such as an infrastructure component like a traffic light, may trust that the broadcasted message is legitimate and to be trusted. In some embodiments, the system's Public Key Infrastructure (PKI), digital certificates, authenticated communication lines, digital signing, and the like, support features such as message authentication, secure grouping, privacy and security.

There may be a variety of emergency and other governmental vehicle group types beyond fire trucks as well as infrastructure group types that may put such capabilities to use, examples include: ambulances, police vehicles, tow trucks, hazardous materials (HAZMAT) vehicles, military vehicles, traffic lights, street lights, fire control infrastructure, etc. Sender identification, messages sent, granularity of digital authentication, etc., may vary for different use cases. In some embodiments, the messages or information shared and broadcast by a vehicle, infrastructure, or other supported devices may vary depending on request types and/or a requesting party's specific requests.

A system of tiered information or a tiered set of identities that may be provided by a vehicle (or other endpoint device or manufactured product) may be released on an automated or manual basis upon request received from a member of one or more approved authorities. For example, a police vehicle may request vehicle license plate or registration identity or information based on the authority associated with that officer. A request for more sensitive information (for example, insurance information) may require a higher authorization than what an ordinary police officer may possess. Such a request for sensitive information may have to come from a higher authority, or the authority may be provided to a police officer once that officer files a report or files a request for such information to be released by a vehicle.

Requests and responses of controlled information may be made on an automated or manual basis and be accompanied by appropriate digital certificates, digital signatures or other system supported method. Defined levels of limited access may be provided to any external device. However, granularly higher levels of access might be provided to granularly defined external groups based on authenticated relationships or group membership, as described above. Examples of such access may include: (a) a vehicle maintenance group; (b) a governmentally-approved group to access an on board diagnosis (OBD) port for appropriate government monitoring needs.

FIG. 4 shows a security system for authenticating a new product including IoT devices, according to some embodiments of the disclosed invention. Manufactured products incorporating IoT devices are typically sold or otherwise provided to buyers, lessees, or other end users. In some embodiments, such a product may be a car with a buyer 411 buying a car 412. In such a case a buyer's purchase is made more secure through the incorporation of a digital certificate 401 encompassing pertinent and authenticated information about the car, the IoT devices associated with the car and other information. Such a digital certificate 401 may be delivered from a security ecosystem 402 to a buyer's mobile device 403, tablet device 404, computer 405 or other devices. The security ecosystem platform 402 includes one or more of a PKI, PMI and AA. The buyer 411 may execute his/her purchase contract, for example, with a digital signature using a security ecosystem supported mobile device 406 that has been authenticated through the security ecosystem. These digital records 407 may then be transferred to a lender or other interested parties and a lease or a loan agreement might also be digitally signed (408).

A record of the purchase combined with a digital record of the car (and possibly a lease or loan document (409)) is then recorded (by a lender, security ecosystem or other) in an immutable manner (410). One example of such a recording may be on a Blockchain™ or similar media 418, as shown by 410. The buyer 411 and car's relationship may also be authenticated with each other, with a buyer's client application on a buyer device 413, and with both the car (through one of its IoT devices 414) and the car's passive key and entry system (key fob device) 415. The buyer's mobile device, the car and the passive key entry system will then all become members of an authenticated group, for example an "IoT Devices Group" 416.

Figure 5:
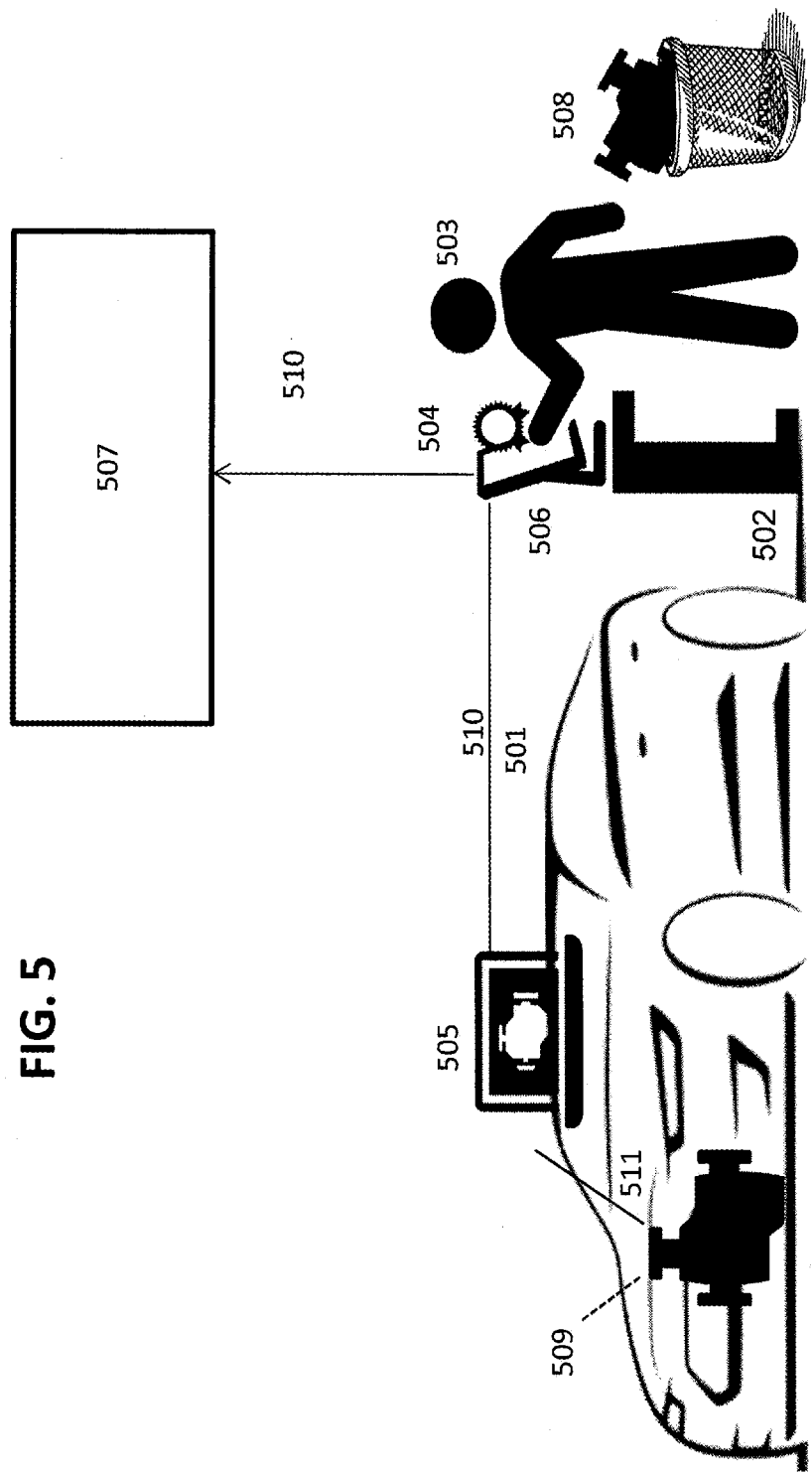
FIG. 5 shows a security system for maintenance of a product including IoT devices and their possible replacement, according to some embodiments of the disclosed invention.

FIG. 5 shows a security system for maintenance of a product including IoT devices, according to some embodiments of the disclosed invention. When bringing a product, for example, a car 501 to an automobile dealership 502 for maintenance, access to the internal IoT devices of the car can be protected by the security capabilities that were previously installed in the car 501. For example, a mechanic 503 seeking access 510 would have to have appropriate credentials 504 to access the car's human-interface control unit 505 through an application on terminal device 506 that had previously been registered within a security ecosystem 507. The mechanic, the application or other acceptable identity would have to demonstrate proper authentication for this purpose. For example, one of them may be an authenticated member of a dealer maintenance group with privileges to access IoT devices within the car with definable rights to conduct specified types of maintenance work on the car. For example the mechanic may determine that the engine control unit is defective and remove it (508) and then install a replacement (509). The mechanic would typically delete the defective engine control unit from the car's records within the security ecosystem 507 and replace it with a new engine control unit record. The replacement process would include appropriate inviter-invitee process between IoT devices 511 (and possibly provisioning process, as described previously), and updating 510 of records for the car 501, to reflect the IoT device replacement and its updated IoT device group within the security ecosystem 507. The security ecosystem platform 507 includes one or more of a PKI, PMI and AA.

Figure 6:
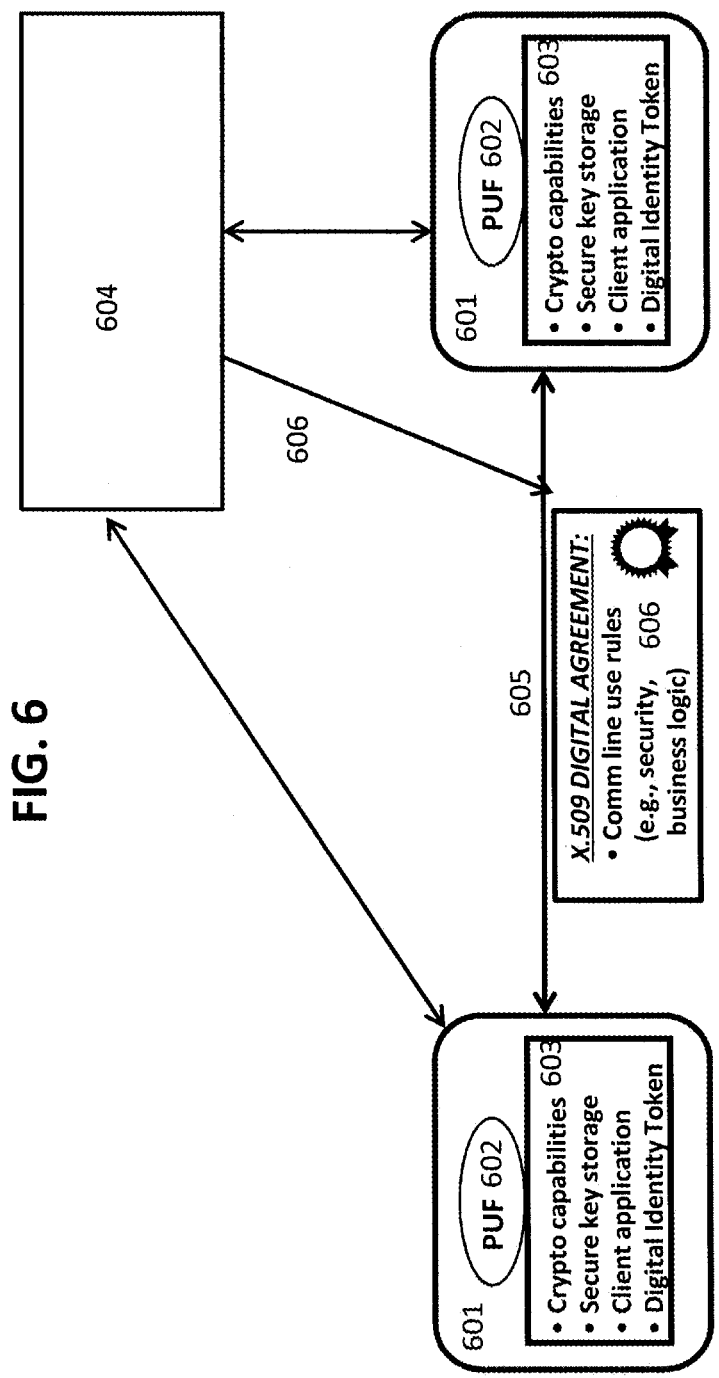
FIG. 6 depicts some elements of a secure and authenticated communication line, according to some embodiments of the disclosed invention.

FIG. 6 depicts some elements of a secure and authenticated communication line, according to some embodiments of the disclosed invention. As shown, an IoT endpoint 601 should typically have a secure root key provisioned as a method or establishing a unique identifier or cryptographic key on the device. One method of doing this is through the use of a PUF 602. Cryptographic algorithms, secure key storage and client application are provided on the device. A unique DIT is created on by the device 601 or may be provided by the security ecosystem 604. The security ecosystem 604 includes one or more of a PKI, PMI and AA. Through the application of an inviter-invitee process between two endpoints 601/601 and with facilitated support from an AA within the security ecosystem 604, those endpoints can establish a secure, authenticated communication line 605 between them. Typically, a communication line is accompanied by a digital agreement that may be recorded in a digital certificate attesting to the communication line and establishing terms (e.g., rules and/or business logic) of the use of the communication line established between the endpoints 606.

Figure 7:
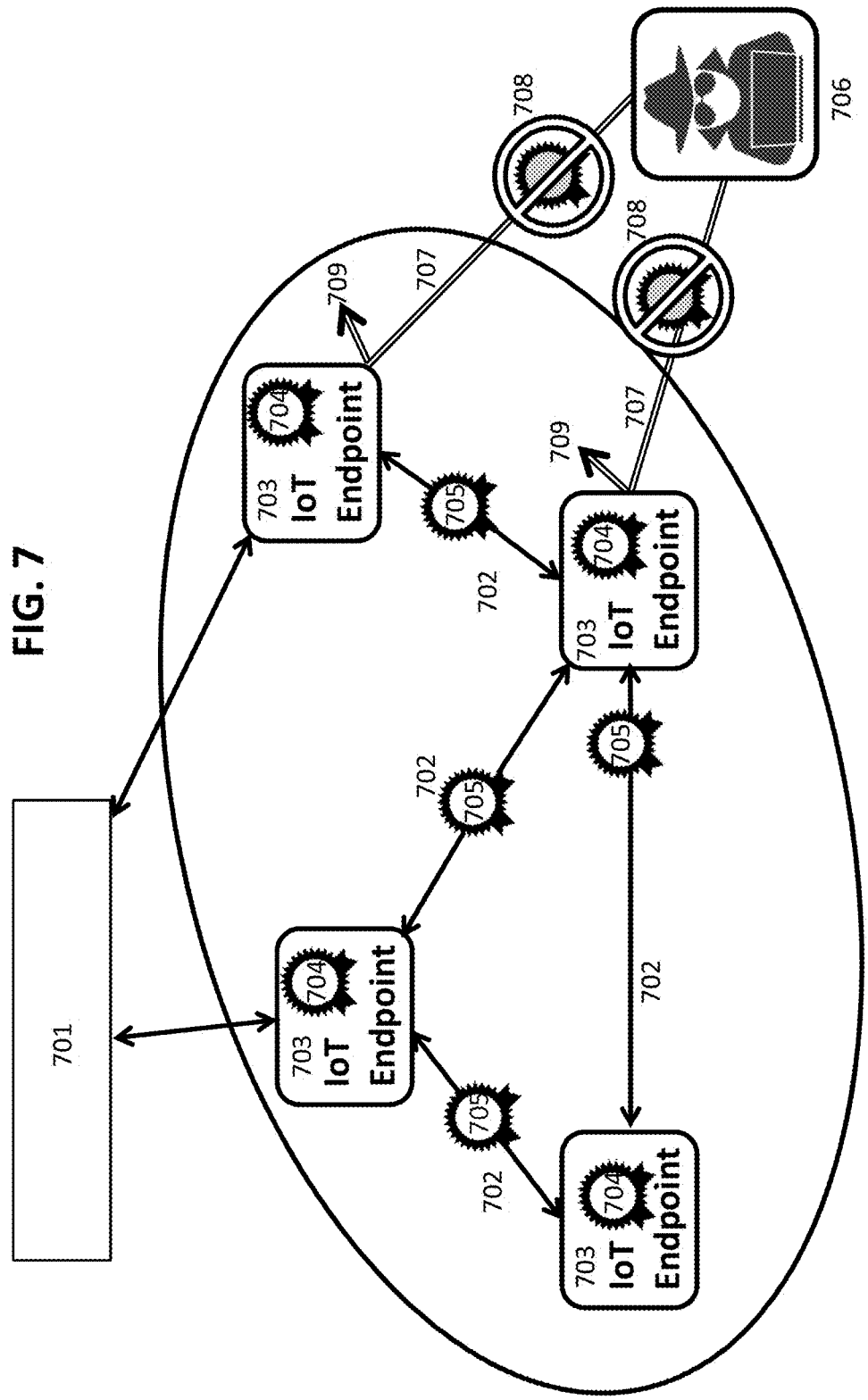
FIG. 7 illustrates some elements of a security ecosystem, according to some embodiments of the disclosed invention.

FIG. 7 illustrates some elements of a security ecosystem 701, according to some embodiments of the disclosed invention. One of the unique elements of the security ecosystem 701 is that the primary enabling security is based upon communication lines 702 between endpoints 703, not just the endpoints themselves. However, the security ecosystem 701 of the disclosed invention not only issues certificates 704 to endpoints 703, but it also issues certificates to each authenticated communication line 705 that pairs of endpoints may establish (have established) and use. By building relationships only upon individual communication lines with certificates, the endpoint communication lines thus established effectively may be considered to have become white-listed. The white-listing of device communication lines would typically be considered to enhance security. Rather than be centrally managed, communication lines are typically established at the endpoint level between pairs of endpoints. This allows authenticated endpoints to establish secure communication lines with authenticated other devices with which they need to communicate with in order to meet operational needs. Communications from an unknown endpoint 706 without secure communication lines 707 that have previously been authenticated and have an issued certificate 708 are prevented or ignored 709 (invitations from unknown endpoints to establish a secure communication are not ignored, however such invitations are managed by an AA which supports the authentication of both devices). This is an anti-spoofing result properly provisioned endpoints with secure communication lines talk only to previously authenticated endpoints and no others.

Figure 8:
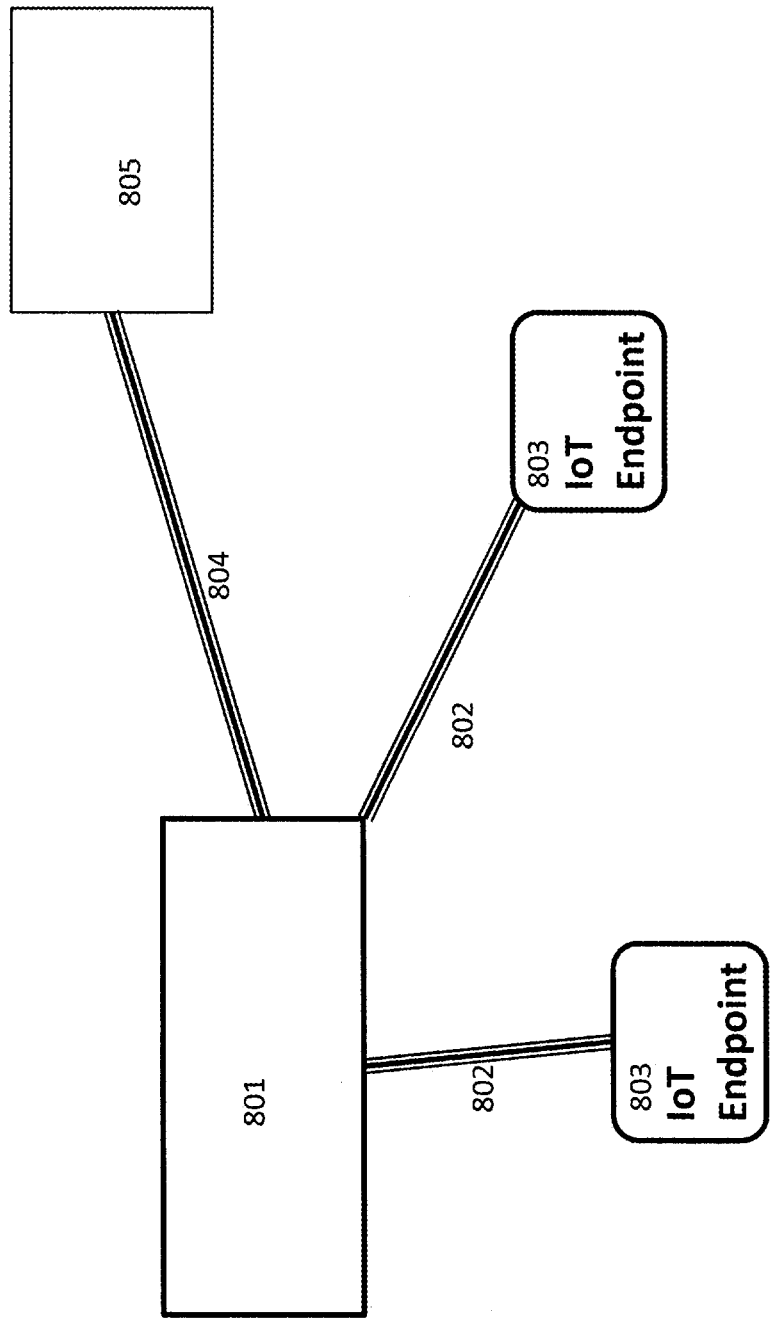
FIG. 8 shows an exemplary use of two application programming interfaces (APIs), according to some embodiments of the disclosed invention.

FIG. 8 shows an exemplary use of two application programming interfaces (APIs), according to some embodiments of the disclosed invention. In general terms, an API is a set of clearly defined methods of communication between various software components. The security ecosystem may support two separate APIs. In some embodiments, an API 802 may be used by a client application on an IoT endpoint 803 to access, control, utilize, etc., the capabilities of the security ecosystem 801. In some embodiments, an IoT endpoint and the security ecosystem may communicate using other methods without an API. A second API 804 may be utilized by an external user, such as a user from an IT department, for multiple uses. One such use is to view the statuses of all or some of the devices (including IoT devices as well as non-IoT devices) secure communication lines, certificates, groups, relationships, etc. created, maintained and/or supported by the security ecosystem. Such an API may provide comprehensive, granular visibility to such information. Such information optionally may be used by an external system or user for a variety of analytics purposes. Optionally, the API may provide capabilities to direct all or a portion of the activities that the security ecosystem may conduct. In some embodiments, an external system operating under the direction of an artificial intelligence computer program can utilize this API.

In some embodiments, the disclosed invention may provide software/firmware updates uniquely for devices. For example, an image of the firmware (or a certificate associated with the firmware) is digitally signed by an established firmware signing authority recognized by a trusted public key being held, for example, by the LKSM of a secure component of the subject device to be updated. Using industry standard code signing technology, the firmware may be digitally signed using the private key of the code signing authority. The signed code is transmitted to the subject device. Upon receipt, the subject device first uses the trusted public key in its possession to verify that the code signing authority did, in fact, sign the code. Upon such verification, the subject device may complete a firmware update.

In some embodiments, a device digital record of the unique image of the device's firmware installation may be provided and the record may then be digitally signed by the device or an authority. If needed, at a later point in time, a new image can be created and compared to the previously created image to determine if the two images match. If they do not match, an attack or other problem with the device may be investigated or other action may be taken.

In some embodiments, audit trails are generated from actions such as inviter/invitee processing, provisioning, the establishment of groups together with other actions taken within the security ecosystem, based in part on digital signatures. Some embodiments provide an audit trail of the composite of the inviter and invitee processing.

Figure 9:
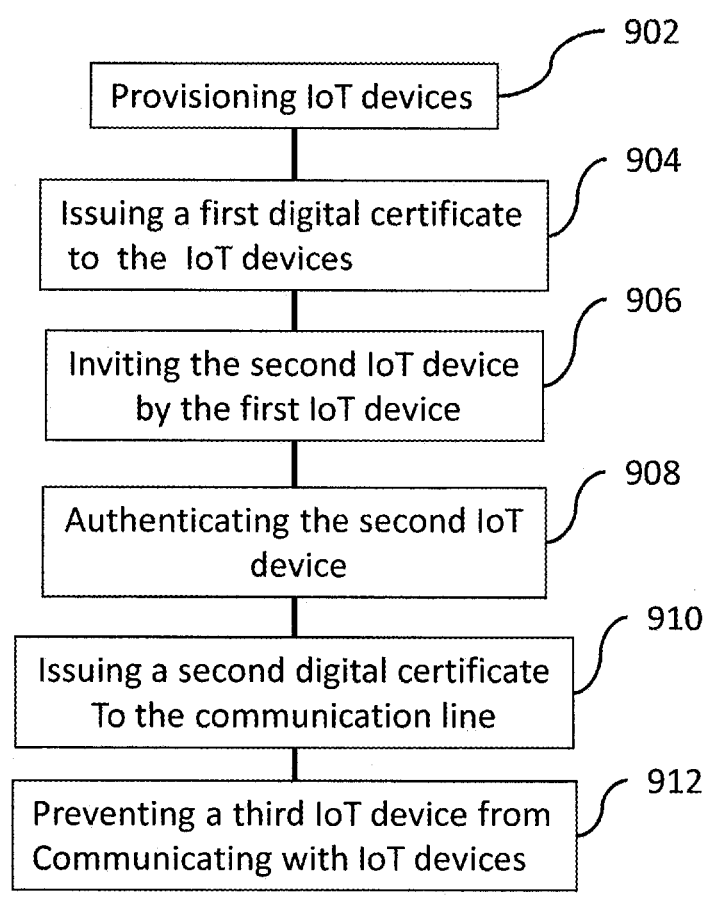
FIG. 9 is an exemplary process flow for establishing a secure communication between a plurality of IoT devices, according to some embodiments of the disclosed invention.

FIG. 9 is an exemplary process flow for establishing a secure communication between a plurality of IoT devices, according to some embodiments of the disclosed invention. As shown in optional block 902, a first and a second IoT devices may be provisioned by providing a unique identification, a digital identity token and a cryptographic key to and authenticating each of the first and second IoT devices. As described above, the provisioning may be performed at the time of manufacturing a product that includes some IoT devices, at the time of installing the IoT device within the product, at the time of programming the product or the IoT devices, or at any time before establishing the communication between the IoT devices at issue. In either case, the IoT devices at issue would have a unique identification and a cryptographic key and are authenticated before they establish a secure communication line.

A first digital certificate is issued to the devices, for example, by a trusted third party, such as an attribute authority (AA), in block 904. In block 906, a first IoT device invites a second IoT device to establish a (unsecure) communication line with the first IoT device by receiving a digital token from the second IoT device. In block 908, the second IoT device is authenticated to the first IoT device using the unique identification, the digital identity token and cryptographic key of the second IoT device, as described in detail throughout the present disclosure. In block 910, a secure communication line between the first IoT device and the second IoT device is established by authenticating the unsecured communication line using a second digital certificate provide to the communication line between the first IoT device and the second IoT device. This way, the security ecosystem of the disclosed invention not only issues (first) certificates to IoT devices (endpoints), but it also issues (second) certificates to each authenticated communication line that pairs of IoT devices (endpoints) have established and use.

In block 912, another (a third) IoT device for which a secure communication line to the first or second IoT device has not been established is prevented from communicating with the first or second IoT device.

Utilizing the method and system of the disclosed invention, it would be possible for various authorized parties to establish and/or monitor and/or modify the various group and subgroup memberships and/or rules/business logic that may exist within the manufactured product. These may include a: manufacturer, manufactured product owner, court with jurisdiction, and others.

In some embodiments, a group defines function and/or role, such an external-facing sensors group, groups or subgroups of devices on a CAN bus, all devices within a vehicle, endpoints, and external entities that are responsible for maintaining designated vehicles. An active group may include as few as one active member. A group administrator is considered a member of the group. An attribute certificate for the group indicates group characterization (e.g., external-facing sensors group, vehicle(s), department(s) and/or role(s)), and references a public key certificate that includes a signature verification public key. The corresponding signature generation private key is held by the group administrator. For example, in the case of a vehicle this may be a master IoT device management entity (e.g., a CIoT device)

which may be controlled by a human or an artificial intelligence capability. For example, in the case of a vehicle maintenance group this may be a designated endpoint computing device which may be controlled by a human or an artificial intelligence capability. This key is used to assign the group public key that is used for encryption or key establishment. This mechanism enables the group administrator to (re-) assign values to the group public key as long as the attribute certificate (or its replacement) is currently valid and the signature verification public key has not been revoked.

In some embodiments, there are at least two ways for the group administrator to securely provide the group private key to other current members of the group: (a) use can be made of (certificate-bearing or otherwise authenticated) encryption public keys or key establishment public keys of prospective group members; (b) use can be made of ephemeral key establishment public keys that have been digitally signed using digital signature generation private keys of prospective group members that correspond to certificate-bearing or otherwise authenticated signature verification public keys. If a (non-group administrator) group member's access is to be deleted, the group administrator can assign a new value to the group public key and distribute the corresponding group private key to surviving group members (as well as to new group members if/when such are added).

Attribute certificates are typically generated (by the security ecosystem Attribute Authority (AA) as a result of successfully executed actions by inviter-intended invitees (including all device/endpoint authentication methods for the purpose of establishing secure communication lines as described in this application) enable securely authenticated persistent and private point-to-point communication lines, as well as upon the creation of groups. Each AA-issued attribute certificate points to one or more digital certificates that contain a subject public key. Such public key certificates may be issued by the security ecosystem's certification authority or by a cross-certified external certification authority.

In some embodiments, the attribute certificates explicitly reference public key certificates (or other encapsulations of public keys (e.g., "certificate-less" Identity-Based Encryption (IBE)) where cryptographic binding to specific PKCs/public keys (for example, of answers by Invitees to security questions posed by Inviters) within attribute certificate generation request-/Invitee processing-messages (including all device/endpoint authentication methods for the purposed of establishing secure communication lines as described in this application) provides protection against false attribution attempted to be perpetrated via, e.g., server insider attack where the AA has not been compromised. The AA can determine whether or not the answer(s) provided by the purported Invitee are correct based on data supplied by the Inviter, where such data makes judicious use of randomness to prevent exposure outside of the AA. Furthermore, the Invitee communications and processing is designed to be phishing resistant with regard to leakage of information to impostors.

Per RFC 5755 http://datatracker.ietf.org/doc/rfc5755/ that defines a profile for the use of X.509 attribute certificates in Internet Protocols, "When making an access control decision based on an AC, an access control decision function may need to ensure that the appropriate AC holder is the entity that has requested access. One way in which the linkage between the request or identity and the AC can be achieved is the inclusion of a reference to a PKC within the AC and the use of the private key corresponding to the PKC for authentication within the access request." Note that such proof of possession of the private key can be used preemptively within the Invitee protocol as a condition of including a reference to the corresponding PKC in a resultant AC. Note that while RFC 5755 speaks of authentication of an access request, the evidence of use of the private key may be implicit, e.g., as anticipated by making use of the corresponding public key to securely convey a digital asset key that remains inaccessible in the absence of knowledge of the private key. While the use of Inviter-posed security questions may be considered optional, if they are invoked the methodology briefly outlined above thwarts attempts to hijack the formulation of the communication line between an Inviter and the intended Invitee.

In some embodiments, the mapping of attribute certificates to public key certificates is flexible. For example attribute certificates may be issued to devices/endpoints/holders/owners at an individual device/endpoint/- or group- or department-level (i.e., at the device/endpoint-/end-node-level), while referenced Per RFC 5755, an access control decision function may need to ensure that the appropriate AC holder is the entity that has requested access. One way in which the linkage between the request or identity and the AC can be achieved is the inclusion of a reference to a PKC within the AC and the use of the private key corresponding to the PKC for authentication within the access request." Note that such proof of possession of the private key can be used preemptively within the Invitee protocol as a condition of including a reference to the corresponding PKC in a resultant AC. Note that while RFC 5755 speaks of authentication of an access request, the evidence of use of the private key may be implicit, e.g., as anticipated by making use of the corresponding public key to securely convey a digital asset key that remains inaccessible in the absence of knowledge of the private key. While the use of Inviter-posed security questions may be considered optional, if they are invoked the methodology briefly outlined above thwarts attempts to hijack the formulation of the communication line between an Inviter and the intended Invitee. may correspond to private keys owned and held by, for example, at a master IoT device management entity or an entity's IT Department servers—where multiple attribute certificates may thus reference a Public Key Certificate in common. In the case of digital signature generation private keys (as opposed to decryption and/or key establishment private keys), an exception may be made for digital signing of (plaintext) digital assets, messages or other digital asset that takes place at the device/endpoint/end-node level (while any digital signing of communications/requests to the security ecosystem takes place at a master IoT device management entity or an entity's IT Department servers).

For outbound digital assets/digital assets: digital asset key generation, digital asset encryption, and targeted encryption of digital asset keys may take place at an entity's IT Department servers. For inbound digital assets: recovery of digital asset keys using decryption and/or key establishment private keys, and ciphertext digital asset decryption may take place, for example, at an entity's IT Department servers. A hybrid approach may be used such that for certain sensitive operations and/or certain key devices/endpoints/employees, live digital asset encryption or decryption takes place at an end node/endpoint/device. In such case, in addition to the outbound digital asset prepared at the end node and transmitted for the intended recipient(s), a copy of each outbound digital asset generated at the end node/endpoint that is accessible at the entity under certain conditions may be retained or archived. The generation of this copy may entail the use of an encryption or key establishment public key for which the corresponding private key has been escrowed on behalf of the entity. Similarly, for inbound digital assets, the end node's decryption key or key establishment private key may be available from escrow under certain circumstances.

In some embodiments, related attribute certificates may be issued in order to reference related public key certificates. For example, two related attribute certificates may be issued where one references a public key certificate containing a subject public key for use in encryption or key establishment while the other references a public key certificate containing a subject public key for use in digital signature verification. While some prior methods indicate only a single PKC can be referenced by an AC within the base CertificateID option of the AC Holder field (as "the issuer and serial number of the holder's Public Key Certificate"), the serial number field of the AC does not have any specific requirements for assignment, other than uniqueness, i.e., there is no requirement that the serial numbers used by any AC issuer follow any particular ordering. In particular, they need not be monotonically increasing with time. Each AC issuer must ensure that each AC that it issues contains a unique serial number. Consequently, as a way of dealing with the limitation of associating at most a single PKC with each AC, formally related serial numbers within ACs (e.g., same except for an addendum sub-serial number) may be used to reference related PKCs. This method can be used for indirect but explicit proof of possession of a private key by inheriting the explicit proof of possession of private keys that preceded generation by the AA of the related ACs that reference PKCs.

For example, presentation of an appropriate digitally signed message (proving possession of a signature generation private key) may be used to justify later receiving encrypted communications/digital assets/files where the digital asset keys are encrypted based on use of an encryption public key or key establishment public key that is in a PKC that is referenced by an AC that is related to the AC that references the signature verification public key corresponding to the signature generation private key that was used to generate the digitally signed message. Note that this "U-shaped" association of say PKC1 to PKC2 (by proving possession of the subject private key corresponding to PKC1 that is referenced by AC1 that is related by serial numbers to AC1 that references PKC2) does not rely on PKC1 and PKC2 being in any way directly linkable (such as through related choices of subject name or subject alternative names that may include such data as email addresses or IP addresses). Note that PKC1 and PKC2 can be generated by distinct CAs.

In some embodiments, it is desirable to be able to provide a service whereby a security ecosystem mediates the targeted distribution and/or encryption/decryption of digital assets, messages or files and/or other communications across domains such that there is end-to-end trust in the routing. It is known that privilege management can be addressed via attribute certificates that include authorization(s) (and/or other attribute(s) that may, in particular, include name(s) and/or identifier(s)), and that can be configured to (preferably unambiguously) reference one or more identity certificates (also known as public key certificates or public-key certificates) that each include a subject public key and subject name. For example, a public key certificate may be referenced within an attribute certificate by a hash of the public key certificate or by a hash of the subject public key or by a hash of other field(s) of the public key certificate. Such hash may be a one-way hash. The actual hash values that are used may be sparse amongst the set of all possible hash values.

In some embodiments, attribute certificates can be used as a basis of mediating digital asset and communications distribution as described in the following in which, for example, references for a "pointer value" may be when a pointer value may be comprised of a hash of an attribute certificate or a hash of one or more fields of an attribute certificate. Such hash may be a one-way hash. The actual hash values that are used may be sparse amongst the set of all possible hash values. In some embodiments, pointer values may alternatively or additionally be based on data associated with but external to attribute certificates. Such data may include indices within a database.).

In some embodiments, attribute certificates are not necessarily considered public information within this model. Rather, knowledge of (or direct or indirect access to) a "pointer value" that (preferably unambiguously) references an attribute certificate associated with an intended recipient or group is used as an indicator to the mediating security ecosystem that the a communications originator of a digital asset (for example endpoint/device, entity or individual or group) may have been deemed eligible to correspond with the entity or endpoint/device/individual or group represented by that particular attribute certificate. However, in order to deal with the possibility of unauthorized dissemination/forwarding of attribute certificates and/or pointer values, the security ecosystem or a recipient device or other endpoint may reject queries/requests concerning particular attribute certificates if the requester does not appear as currently eligible based on database(s) available to the security ecosystem.

For convenience, in some embodiments, the endpoint/device, entity or individual or group represented by a particular attribute certificate is designated henceforth as the "owner" of the attribute certificate. This is analogous to considering the owner of an identity certificate to be the owner of the private key corresponding to the subject public key within the identity certificate. A given endpoint, device, entity, individual or group may be represented by multiple distinct attribute certificates. Across such multiple distinct attribute certificates, there may be attribute(s) that are held in common across two or more such attribute certificates and/or references to public key certificate(s) that are common across two or more such attribute certificates.

Access to knowledge of one or more pointer value(s) that each reference an attribute certificate of a particular attribute certificate owner does not necessarily imply access to other attribute certificate(s) (or their pointer value(s)), if any, of that attribute certificate owner. Pointer values do not necessarily need to be known by a potential digital asset/communications uploader or directly accessible to a potential digital asset/communications uploader or to a potential digital asset/communications uploader's (including a endpoint, device), host computer or other computing device in order to provide eligibility to upload or transmission to a recipient. For example, such pointer values may be part of the data associated with the potential digital asset/communications uploader's, endpoint's, device's. The potential digital asset/communications uploader, as a security ecosystem device/endpoint/subscriber, may have earlier pegged a "nickname" for an attribute certificate owner to a pointer value that is held in that security ecosystem device/endpoint/device/subscriber's account data or record information.

Knowledge of or (direct or indirect) access to a pointer value potentially enables successful communication to the owner of the corresponding attribute certificate, it may be advantageous to provide offers of an inviter's, device's, endpoint's own pointer values. One may be able to make a request to the mediating security ecosystem regarding which pointer values and/or attribute certificates to make available to particular security ecosystem device/endpoint/subscribers, where these pointer values may be in the requesting device/endpoint/subscriber's account data or record information whether or not the requesting device/endpoint/subscriber owns one or more of these attribute certificates. There may be conditions associated with the forwarding of pointer values for temporary and/or sustained use. Such conditions may be set by the system and/or by individual security ecosystem device/endpoint/subscribers and/or by groups or other aggregations of security ecosystem device/endpoint/subscribers. Such conditions may be associated, for example, with an invite process/inviter process.

One reason for attempting to forward pointer values in addition to an inviter's own is that a successfully accepted invite can enable the invitee to potentially successfully communicate with colleagues and/or other associates of the inviter or devices or endpoints associated with the inviter (such as groups) by virtue of the invitee having direct or indirect access to pointer values to attribute certificates of such colleagues/associates, devices/endpoints/groups. An invitee protocol (a.k.a. an invite-acceptance process) itself may involve use of one or more of the inviter's and/or inviter's colleagues' or endpoint's or device's attribute certificates. In particular, during an invitee protocol run the host computer or device used by the invitee may be exposed to data that has purportedly been digitally signed using a private key of the inviter. It may be important for an invitee to independently verify the source of such data prior to entrusting the process with his/her own data that is requested for fulfillment of invitee requirements. An attribute certificate that references the public key to be used to verify the digital signature(s) may contain information about the inviter that can be considered by the invitee, perhaps as part of the decision whether to proceed. An invitee protocol run (including all device/endpoint authentication methods for the purposed of establishing secure communication lines as described in this application), if successfully executed, may result in issuance of one or more attribute certificates owned by the invitee. An invitee protocol may be designed so that an inviter's host computer or device or other endpoint can be used to determine from such attribute certificate(s) whether or not the specifically intended invitee had actually participated in executing the invitee protocol. A preferred embodiment may be designed to provide an audit trail of the composite of the inviter and invitee processing.

In some embodiments, as part of an invite protocol/inviter protocol (including all device/endpoint authentication methods for the purpose of establishing secure communication lines as described in this application), an inviter may be able to opt whether or not (preferably unambiguous) references (accomplished, for example, via hashing which may be one-way hashing) to one or more of its attribute certificates are permitted to be included within attribute certificate(s) for the invitee that result from successful execution of the invitee protocol. The invitee may be able to choose whether or not to include such references in the resultant attribute certificate(s). This "chaining" of attribute certificates can be used to supply a chain of endorsements. Such endorsements may be a component of a reputation scoring method enabled through inviter and invitee processing. Even if a reference to a particular other attribute certificate is contained within an attribute certificate, knowledge of such other attribute certificate is not necessarily released by the security ecosystem each time that knowledge of the containing attribute certificate is released by the security ecosystem. The owner of a contained attribute certificate and/or the owner(s) of containing attribute certificate(s) may potentially stipulate one or more conditions of such release. If one-way hashing is used as means of referencing attribute certificates, then without such release it may be difficult to reconstruct the attribute certificate.

Since the disclosed invention allows for attribute certificate pointer values that reference attribute certificates, and attribute certificates that reference public key certificates, these relationships can be independently verified at end entities, endpoints, devices using suitable software and/or hardware if the system is so configured. A certificate issuer may be trusted directly or a public key certificate for that issuer may occur within a chain of certificates such that an entity higher in the hierarchical chain is directly trusted. An attribute authority (AA) may be assigned responsibility for issuing the attribute certificates, where such responsibility may be represented by a public key certificate for that entity or direct trusted knowledge of the AA's public key. The legitimacy of attribute certificates may be determined, at least in part, through testing the digital signatures that are part of properly formed attribute certificates. These digital signatures may be verified using a public key of the AA (as determined, for example, from a public key certificate for the AA or from direct knowledge of a public key associated with the AA) and therefore resulting in an end-to-end verifiability.

In some embodiments, the system of the disclosed invention may be configured in various ways such that there may be choices as to what is exposed to the user interface as opposed to what is processed at a user's/device/endpoint/subscriber's client, browser, host computer and/or peripheral devices without necessarily being thus exposed. Full or partial verifiability may occur repeatedly over the same data. That is because such data is not necessarily retained. For example, "nicknames" may be used to refer to certain items, such as attribute certificate pointer values or attribute certificates, where such nicknames may be locally retained or remembered or accessible from a source perhaps other than the security ecosystem. The security ecosystem may be able to receive nicknames and return the intended items (perhaps because of previous assignment of nicknames to items), where the receiver may independently verify the returned items. Nicknames may be used in this "pulling" manner for items to be retrieved by the nickname-submitter and perhaps verified. Nicknames may also or alternatively be used in a "pushing" manner for items to be made available through the security ecosystem to an identified (individual or device/endpoint or entity) device/endpoint/subscriber and perhaps verified. Verification may in some embodiments be done on a random basis rather than on a regular or periodic basis. It is known to use random checking to discover (maliciously imposed and/or naturally occurring) system anomalies as a means of reducing cost(s) and/or inconvenience.

An inter-entity preemptive invite process according to some embodiments of the disclosed invention is capable of establishing matrices of exchanged pointer values corresponding to existing attribute certificates. The process enables a mediating security ecosystem as a bridge for entity-to-entity bulk exchange of attribute certificates through the security ecosystem. This may be in lieu of invites targeted to single individuals, device/endpoint/entity-members/users/subscribers of the security ecosystem can set updatable whitelists that "preemptively" invite other selected device/endpoint/entity-members by pushing an attribute certificate pointer value and perhaps related information (and/or full attribute certificates) into the security ecosystem-held account data of the invitee entity(s) designated by name or other identifier from the list of device/endpoint/entity-members made available by the security ecosystem to its device/endpoint/entity-members (for those that do not opt out). Follow-up to this preemptive invite process/inviter process may be limited to the invitee using the encryption public key associated with the received pushed attribute certificate to submit (preferably digitally signed) digital asset(s) comprised of lists of (appropriate subsets of) the uploading entity's attribute certificate pointer values and perhaps related information (and/or full attribute certificates), to be matched against corresponding attribute certificate data of the inviter (possibly in a matrix format) when the inviter entity responds with a (preferably digitally signed) digital asset encrypted using the invitee's encryption public key associated with the attribute certificate that was presented with the invitee's digital asset for this purpose.

The mediating security ecosystem may be responsible for providing the public key certificate for the encryption public key as subject key. The mediating security ecosystem may be responsible for presenting attribute certificates that reference public keys or public key certificates (where the inviter and/or invitee may have indicated to the security ecosystem the pointer values for attribute certificates, or have indicated "nickname(s)" that map to such pointer values). In this description, "encryption public key" may refer to a key used for key establishment, whereby a resulting shared secret value is used to derive a symmetric key used for encryption and for decryption. Such key establishment may be based on Diffie-Hellman. In some embodiments, encryption public key may also refer to a key used for encryption, whereby a corresponding decryption private key is used for decryption.

A device/endpoint of an entity/company or other computer user may already be employing public-key/asymmetric cryptography using a client (possibly installed on a host computer or on a peripheral device such as a smart card, or across multiple platforms). In some embodiments, the security ecosystem-mediated system may allow import of such pre-existing public keys. Such public keys may already bear certificates that can be used within the security ecosystem-mediated system (e.g., under certification by the security ecosystem's CA of the CA that originally issued such public key certificates or of a CA that that issuing CA is subordinate to). Alternatively (or in combination), all or some such public keys of a given user may become subject public keys of certificates issued by the security ecosystem's CA. Although, the following description regards signature verification, signature generation keys and encryption & decryption keys, as one skilled in the art would recognize, such description may easily be broadened to include keys used for key establishment. In all the cases, the private key is used by the owner of the certificate that includes the corresponding public key, while that public key is used by the other/relying party.

In some embodiments, protective measures may be taken to avoid bypassing an entity's or other original key usage policy on decryption through routing of data to be decrypted on behalf of the security ecosystem-mediated digital asset/communications management application. Since security ecosystem servers may not be able to routinely access the private keys (and thus cannot necessarily determine legitimacy of submitted putative encrypted digital asset keys or other encrypted data), all security ecosystem clients/devices/endpoints (or at a minimum, those that interact with security ecosystem clients/devices/endpoints associated with imported public keys), may be designed to format the data packet such that (with high probability) it is distinguishable from arbitrary data. Imported public key-based use of decryption private keys can then be configured to reject putative security ecosystem-based data that does not reveal the expected pattern/formatting when the decryption private key is applied. If the expected pattern/formatting is present, then release of the digital asset keys or other data into the security ecosystem-mediated digital asset/communications management system client may be permitted.

Possibly dependent (for security consistency) on the security afforded the plaintext digital asset, a digital asset key may or may not be protected via encryption during local transit to its use for ciphertext digital asset decryption if such transit is outside of a protected environment. If the digital asset key is protected in transit, then the ciphertext digital asset decryption module would need to first decrypt the encrypted-for-transit digital asset key by applying its knowledge of the appropriate transit key. With regard to the use on a host computer/devices/endpoints (or a peripheral device) of a signature generation private key for both non-service-provider-mediated business and as a security ecosystem device/endpoint/subscriber, the non-repudiation aspect can be proactively disambiguated if the security ecosystem usage always includes in the arguments that are signed a "security ecosystem marker field" that serves to prevent the successful false attribution of security ecosystem system-sourced signed messages to non-service-provider-mediated business. This is consistent, in particular, with an operational paradigm in which the signature generation private key corresponds to a signature verification public key that bears a certificate issued by an entity's CA, the signature generation private key never leaves the confines of the entity-provided execution environment on the device/endpoint computer (or peripheral), and hashes of messages to be signed on behalf of the security ecosystem client are input to the entity-provided execution environment. The security ecosystem marker field can be post-appended, prepended, or exclusive-ored to the input message hash, prior to signing. Other ways of applying the security ecosystem marker field might be implemented. Such application may involve an additional hash operation, such as, for example, hashing after the security ecosystem marker field has been appended to the input message hash. In order to be assured that message hash inputs are legitimately sourced from the security ecosystem client software, the entity-provided execution environment and the service-provider client software that generates the message hashes may share an authentication key, for example, a Message Authentication Code (MAC) key, if the message hashes are generated outside of the entity-provided execution environment.

As the inclusion of digital signatures in message transmission typically increases overall message latency, the following describe methods of some reduction of the overhead of using digital signing for message authentication. For many lightweight messaging protocols, for example Message Queue Telemetry Transport (MQTT) that is used on top of the TCP/IP protocol, bandwidth is limited. This is particularly true for the case when message transmission completion latency is important. Message packet sizes are made small to desirably keep latency low. Limited bandwidth availability can make it challenging to use technologies such as the digital signing of transmitted data due to the overhead of attaching comparatively large digital signatures to each packet.

FIG. 10 shows an exemplary method of using digital signatures in bandwidth-restricted environments, according to some embodiments of the present invention. This method reduces bandwidth required for transmission of data. In some embodiments, rather than transmitting a digital signature attached to each data payload, a value "n" is selected such that a digital signature is transmitted once every "nth" payload. This allows a tradeoff between security and bandwidth by adjusting the value of n, depending on various applications. This way, a potential intruder/hacker is detected after at most n−1 payload packets.

In some embodiments, an encrypted or unencrypted sequence number 1001 can be added to each packet 1002. Instead of the successive integers ordinarily expected, the sequence numbers may be, for example, successive words of a hash value generated when the initial digital signature 1003 was produced for the transmission of n payload packets. Since the hash value is known only to the sender and the receiver of the digital signature, any packets injected by an attacker would be detected immediately.

In some embodiments, each sequence number 1001 as well as the content of the payload packet 1002 is presented as a mathematical function of the sequence number produced as described in the preceding paragraph. This process would protect not only against packet injection, but also packet alteration of existing, otherwise valid, packets.

FIG. 11 shows an exemplary method of transmitting a digital signature while minimizing the bandwidth required for such transmission, according to some embodiments of the present invention. In some embodiments, this is accomplished by using a sliced digital signature. For example, the digital signature 1103 is cut into n slices 1101 with each slice 1101 being included as a portion of each individual payload 1102 to be transmitted. The receiving entity of the transmission then captures each slice of the digital signature from each payload. Upon receiving n payload packets, the n digital signature slices are reassembled into a complete digital signature, which are then verified through the application of known digital signature technology. By adjusting the value of n, an implementer can trade off the overhead burden of the digital signature with the latency of signature verification, for example, a larger n results in a lower the overhead burden, but the overall message latency may be increased with the increased size of n.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for establishing secure communication between a plurality of devices, each device including a hardware processor, associated memory, a unique identification, a digital identity token and a cryptographic key, the method comprising:
   transmitting over a communication network an invitation to a second device by a first device to establish a communication line with the first device by receiving a digital identity token from the second device;
   authenticating a communication line between the first device and the second device;
   issuing a digital certificate to the communication line to establish a secure communication line between the first device and the second device;
   grouping the plurality of devices into different groups based on a predetermined criteria and storing the different groups in a storage device;
   storing group memberships for the different groups in respective attribute certificates of the respective devices; and
   preventing a device for which a secure communication line to any one of the plurality of devices has not been established, or which is not a member of a group with an approved attribute certificate, from communicating with said any one of the plurality of devices.

2. The method of claim 1, wherein the secure communication line includes a digital agreement establishing terms of use of said secure communication line between first device and the second device.

3. The method of claim 1, wherein a group is issued an attribute certificate which includes associated rules for group membership in the attribute certificate.

4. The method of claim 1, wherein the different groups include sub-groups.

5. The method of claim 1, further comprising:
   establishing a second group of external devices; and
   establishing an attribute certificate for the second group to a member of one or more of said different groups.

* * * * *